US007992881B2

(12) United States Patent
Edelblut

(10) Patent No.: US 7,992,881 B2
(45) Date of Patent: Aug. 9, 2011

(54) MOBILE SYSTEM AND APPARATUS FOR POSITIONING PEOPLE AND FOR SUPPORTING, POSITIONING AND TRANSPORTING OBJECTS

(76) Inventor: Frederick Edelblut, Hopewell, NJ (US)

( * ) Notice: Subject to any disclaimer, the term of this patent is extended or adjusted under 35 U.S.C. 154(b) by 978 days.

(21) Appl. No.: 11/697,847

(22) Filed: Apr. 9, 2007

(65) Prior Publication Data

US 2007/0240918 A1 Oct. 18, 2007

Related U.S. Application Data

(60) Provisional application No. 60/791,713, filed on Apr. 12, 2006.

(51) Int. Cl.
*B62B 5/08* (2006.01)

(52) U.S. Cl. .................................... 280/47.19; 280/206

(58) Field of Classification Search .................... 180/10; 280/1, 47.19, 200, 206, 207, 828, 1.191, 280/1.193, 1.23, 29, 79.2, 259; 108/44; 312/290; 248/123.11; 463/46; 482/54, 78
See application file for complete search history.

(56) References Cited

U.S. PATENT DOCUMENTS

| | | | | | |
|---|---|---|---|---|---|
| 431,894 | A | * | 7/1890 | Horton | 280/206 |
| 523,244 | A | * | 7/1894 | Sprague et al. | 280/47.16 |
| 790,063 | A | * | 5/1905 | Lange | 280/200 |
| 1,230,642 | A | * | 6/1917 | Albano | 482/142 |
| 1,261,955 | A | * | 4/1918 | O'Beirne | 298/10 |
| 1,521,133 | A | * | 12/1924 | Tinker | 280/206 |
| 1,535,090 | A | * | 4/1925 | Baumann | 280/206 |
| 1,676,015 | A | * | 7/1928 | Feick | 280/206 |
| 2,313,868 | A | * | 3/1943 | Garlinghouse | 280/47.19 |
| 2,372,043 | A | * | 3/1945 | Aghnides | 180/6.44 |
| 2,754,120 | A | * | 7/1956 | Green | 280/1.23 |
| 2,923,545 | A | * | 2/1960 | Lytle | 280/206 |
| 2,948,531 | A | * | 8/1960 | Johnson | 280/206 |
| 2,953,394 | A | * | 9/1960 | Anderson | 280/207 |
| 2,996,303 | A | * | 8/1961 | Peltier | 280/1 |
| 3,062,560 | A | * | 11/1962 | Dunstan | 280/208 |
| 3,076,666 | A | * | 2/1963 | Geiser | 280/206 |

(Continued)

FOREIGN PATENT DOCUMENTS

DE 442057 3/1927

(Continued)

OTHER PUBLICATIONS

"History of the Gym-Wheel", TSV Taunusstein Gym-Wheel Team, www.rhornrad.de/pages/com/history, Apr. 28, 2006.

(Continued)

*Primary Examiner* — Jeffrey J Restifo
*Assistant Examiner* — Brodie Follman
(74) *Attorney, Agent, or Firm* — Richard A. Catalina, Jr. Esq.

(57) ABSTRACT

A mobile positioning, supporting and transporting system has two upright generally circular, oblong, elliptical or polygonal support structures joined together with lateral support members to form a freestanding structure with a roughly circular geometry so that it may be tipped end-over-end or rolled to translate from place to place. Any objects attached to or suspended from the structure within the volume space between the support structures readily are moved to a different location or position as desired. Alternatively, the support structures are disassembled and segments thereof may be aligned adjacent one another to form a cargo bin or cart to hold remaining portions of the structure and accessories for storage or transport.

15 Claims, 21 Drawing Sheets

U.S. PATENT DOCUMENTS

| | | | | | |
|---|---|---|---|---|---|
| 3,156,486 | A * | 11/1964 | Fenwick | 280/206 |
| 3,334,915 | A * | 8/1967 | Sulyma et al. | 280/206 |
| 3,428,015 | A * | 2/1969 | Cloud | 441/78 |
| 3,460,828 | A * | 8/1969 | Curlee | 472/26 |
| 3,544,125 | A * | 12/1970 | Unno | 280/31 |
| 3,709,488 | A | 1/1973 | Garner | |
| 3,747,956 | A * | 7/1973 | Heberlein | 280/206 |
| 3,769,929 | A * | 11/1973 | Scheber | 472/128 |
| 3,819,930 | A * | 6/1974 | Lamont | 362/378 |
| 3,856,166 | A * | 12/1974 | Gibson | 414/444 |
| 4,057,262 | A * | 11/1977 | Boon | 280/78 |
| 4,264,081 | A * | 4/1981 | Markham | 280/5.24 |
| 4,458,895 | A * | 7/1984 | Turcotte | 482/78 |
| 4,505,346 | A * | 3/1985 | Mueller | 180/7.4 |
| 4,579,336 | A * | 4/1986 | Morin | 280/206 |
| 4,813,706 | A * | 3/1989 | Kincheloe | 280/756 |
| 4,973,082 | A * | 11/1990 | Kincheloe | 280/756 |
| 5,000,445 | A * | 3/1991 | Petutschnig | 482/78 |
| 5,228,708 | A * | 7/1993 | Verdugo | 280/200 |
| 5,320,372 | A * | 6/1994 | Langen | 280/207 |
| 5,385,498 | A | 1/1995 | Parvardeh | |
| D357,827 | S * | 5/1995 | Schultz | D6/462 |
| 5,419,613 | A | 5/1995 | Wedeking | |
| 5,816,983 | A | 10/1998 | Dawes et al. | |
| 5,876,050 | A * | 3/1999 | Berger | 280/79.2 |
| D418,836 | S * | 1/2000 | Matt et al. | D14/196 |
| 6,074,305 | A | 6/2000 | Schnapp | |
| 6,726,231 | B1 * | 4/2004 | Fuerle | 280/206 |
| 6,786,495 | B1 * | 9/2004 | Browning | 280/206 |
| 6,808,475 | B2 | 10/2004 | Kehrbaum | |
| 6,854,751 | B2 | 2/2005 | Halke | |
| 6,873,884 | B2 | 3/2005 | Brackett et al. | |
| 6,991,437 | B2 * | 1/2006 | Cherry et al. | 417/234 |
| 6,994,528 | B2 * | 2/2006 | Brashears et al. | 417/234 |
| 7,427,080 | B2 * | 9/2008 | Naude et al. | 280/639 |
| 7,640,045 | B2 * | 12/2009 | Troutman | 455/575.8 |
| D610,890 | S * | 3/2010 | Collins | D8/70 |
| 2001/0045497 | A1 | 11/2001 | Coonan et al. | |
| 2002/0134697 | A1 | 9/2002 | Barnett | |
| 2003/0080655 | A1 | 5/2003 | Goldberg | |
| 2004/0168654 | A1 * | 9/2004 | Radtke | 123/2 |
| 2004/0254020 | A1 | 12/2004 | Dragusin | |
| 2005/0099102 | A1 | 5/2005 | Villarreal | |
| 2006/0016372 | A1 | 1/2006 | Younse | |
| 2006/0070901 | A1 * | 4/2006 | Adams et al. | 206/373 |
| 2009/0115158 | A1 * | 5/2009 | Lawrence | 280/200 |

FOREIGN PATENT DOCUMENTS

| | | |
|---|---|---|
| DE | 1698688 | 5/1955 |
| DE | 1603113 | 3/1970 |
| DE | 8028218 | 10/1980 |
| DE | 3904275 A1 | 8/1990 |
| DE | 9014488 | 2/1991 |
| DE | 202005000914 U1 | 8/2005 |

OTHER PUBLICATIONS

"Wheel Gymnastics History", www.usawheelgymnastics.com/history, Apr. 28, 2006.

"Welcome to my Wheel-Gymnastics page!", www.jannissima.de/rhoenrad/rhoenrade, Apr. 28, 2006.

"Das erste 'motorisierte Rhonrad' der Welt . . . !", http://gymmedia.com, Mar. 14, 2006, Apr. 28, 2006.

"Ergoquest We live up to your potential", www.ergoquest.com, Apr. 28, 2006.

"Hospital Computer Carts", InfoLogix, www.infologixsys.com, Apr. 28, 2006.

* cited by examiner

MOBILE SYSTEM AND APPARATUS FOR POSITIONING PEOPLE AND FOR SUPPORTING, POSITIONING AND TRANSPORTING OBJECTS

CROSS-REFERENCE TO RELATED APPLICATION

This application claims priority from U.S. Provisional Application Ser. No. 60/791,713, filed Apr. 12, 2006, the content of which is incorporated herein by reference.

BACKGROUND OF THE INVENTION

1. Field of the Invention

The invention relates to structures used to move and support objects and persons.

2. Description of the Prior Art

Historically, structures and systems for supporting and positioning people and for supporting, positioning and transporting objects have been based on the geometry of the box and the wheel. In box geometry, stability is achieved through the transfer of weight of the structure plus any objects upon or supported by it through the sides or legs of the box to the floor or firmament, where gravitational and frictional forces hold the structure in a stationary position. The more weight the structure bears, the greater the frictional force holding it stationary.

Structures based on box geometry can only be moved through lifting, sliding or turning end-over-end. In the latter case, work must be done to lift one side of the structure upward until the center of gravity shifts far enough for the box to fall on the next side, thereby jarring and potentially damaging contents or any attached objects. This inherent stability is the main advantage of box geometry. For instance, a traditional office desk may support many objects on the horizontal surface and contain many other objects in drawers that require horizontal orientation to maintain order, since tipping or sliding the desk structure could result (i) in objects sliding off the horizontal surface or (ii) in drawers opening and their contents being spilled.

When mobility is required, the box is outfitted with wheels or casters that rotate around a fixed axle or roil within a fixed housing. Alternatively, the box is placed upon a wheeled structure such as a handcart or dolly. Using the inherently mobile wheel in conjunction with the inherently stationary box allows the box itself and any objects contained within or attached to it to maintain their original horizontal orientation during transport.

As the equipment demands of technical and professional fields increase (e.g., many professionals employ two or more processors and multiple displays), so also increases the amount of time and energy expended moving equipment and workstations from place to place. Large corporations routinely move workers and all of their equipment between offices and buildings on corporate campuses, incurring substantial costs in terms of time and productivity. An office move may require a full day's work, including disconnecting and reconnecting cordage, disassembly of a workstation into separate units for transport, and extensive manual lifting to overcome obstacles, such as stairs, doorways and narrow spaces. Moving professionals frequently are hired to protect the corporation and its staff from potential injury or disability in a move.

U.S. Pat. No. 6,854,751 (Halke) describes an object lifting and moving device in which circular rim has a counterbalancing weight on one interior surface and a mounting plate is provided off center within the rim. An object to be moved can be mounted to the mounting plate and then moved by rolling the structure on the circular rim. Such device has no functionality as a stand alone workstation, but merely facilitates moving awkward shaped or heavy objects from one location to another. The objects being moved must be separated from the mounting plate and installed in a new location for use following such move.

U.S. Pat. Publication No. 2001 0045497 (Coonan) concerns a desktop computer and video screen on a portable stand. Such construction is a pedestal or cabinet on a base with castors or wheels. As such, it is top-heavy, and only a limited amount of equipment can be attached or transported. Furthermore, the width of the base leaves little space under the horizontal work surface to allow for ergonomic body positioning of a user.

The information age has brought a 90-degree shift in the way information is processed and presented, from the horizontal paper-based workspace to the vertically-oriented workspace using electronic viewing devices, such as the CRT or the LCD screen. Mobility and connectivity are highly valued, too, as exemplified in the wireless Internet and notebook computers and PDAs. At the same time, people are becoming larger, heavier, and less mobile. The prevalence of computer-interactive activity and video entertainment means that more people spend more time in physically inactive positions.

U.S. Pat. Publication No. 2004 0254020 (Dragusin) discloses a computer/video gaming workstation that is based on box geometry. The workstation makes no provision for transportability, and has only enough horizontal workspace to accommodate a computer keyboard and mouse.

More and more people are working with notebook or laptop computers. Outside the office environment, however, few places are outfitted with ergonomically designed spaces for physically comfortable information-processing with notebook computers. Most often, the portable computer is placed on any available flat surface, such as a dining table or a lap, wherein the viewing area is below the sightline of the user. This causes the user to hunch, slouch or maintain an otherwise poor ergonomic position, which can load to discomfort and injury.

U.S. Pat. Publication No. 2006 0016372 (Younse) shows a combination dinette table and computer workstation assembly in which half of the table surface folds away and the electronic viewing device is then affixed in a vertical position to the wall, thereby raising it to eye level. However, Younse has no ergonomic sitting solution. The assembly stands on two fixed pedestal bases, and is designed for use in a fixed location, such as within a recreation vehicle (RV). It must be disassembled for transport. See also, U.S. Pat. Publication Nos. 2002 0134697 (Barnett), 2003 0080655 (Goldberg) and 2005 0099102 (Villareal), which describe various wheeled cabinets and pedestal constructions that may accommodate a notebook computer. None of these provide accommodation for the legs and body position of the user. Moreover, the constructions must be lifted or disassembled to negotiate stairs or uneven terrain.

Internet use and video gaming require a user to focus intently on the screen or monitor. Some video gaming facilities include structures in which a user may sit while playing a game. U.S. Pat. No. 5,419,613 (Wedeking) describes a gaming chair with a curved base that has an attachment for a joystick or other gaming control. Wedeking's chair has a low center of gravity, making it difficult to sit in or rise out of the chair. Wedeking does not include an integrated computer keyboard or mouse, or any other workstation features. His gaming chair is dedicated solely to video games.

U.S. Pat. No. 1,676,015 (Feick) shows a sporting wheel that has two hoops connected together by rods or traverses. A person may be supported within the wheel by standing on two of the traverses (foot supports) and holding on to handles associated with the hoops. Feick's sporting wheel has no associated work station or fixtures for securing computing equipment thereto. Feick's sporting wheel is meant to continue to roll during exercise, and lacks stability that would be required for stationary work station use. See also German Pat. Appln. No. DE 3904275 (Ruh).

In summary, prior art based on box-and-wheel geometry does not describe an apparatus that provides for mobility, transportability, stability, versatility of application, and range of motion in a single system.

BRIEF SUMMARY OF THE INVENTION

A positioning, supporting and transporting system for transporting objects such as work accessories, has first and second support frames each defining a rollable periphery. Each frame has at least one base portion on which the system may be supported when in a stable working position. The system further includes at least one lateral support connecting the first support frame to the second support frame in spaced apart relation to define an inner space between said first support frame and said second support frame with the base portions of the first and second support frames aligned generally opposite one another. The system is translatable from one location to another location by rotating said first and second support frames along said rollable peripheries. Ideally, each support frame defines a rollable periphery with a closed shape whose chord segments total 360 degrees with at least one straight chord segment forming the base portion. The reliable periphery shape may be selected from regular shapes such as circular, oblong, elliptical and polygonal, or irregular shapes, such as a modified egg shape with a curved portion connected to at least one flat portion.

The system may include a mount connected to or associated with one or more of the lateral supports or upright supports for mounting at least one electronic accessory at least partially within said inner space for use within said system, with said accessory remaining so mounted upon translating said system from one location to another location. The mount may comprise a swivelable arm that allows the mount to be adjusted from one position within the inner space to at least one alternate position which may be within or without or partially within the inner space. Electronic accessories that can be mounted into the system include computer monitors, computer hard drives, video monitors, flat panel displays, notebook computers, keyboards, computer controls (such as computer mouse), lights, video controls, video game consoles, batteries, power generators, telephones, cell phones, head phones, microphones, sound/audio speakers, video cameras, cameras, voting machines, currency dispensing machines, and automated teller machines.

The support frames may have segments so that they can be disassembled for storage. The support frames optionally may be formed with hollow channels or hollow tubing. With such configuration, cables or wiring associated with the electronic accessory or electronic accessories may be held within one or more of the support frames.

In certain embodiments, the lateral supports may be collapsible from a first length when the system is stationary and in the working position and a second length shorter than the first length when the system is translated. Thus, the width of the inner space of the system may be reduced to pass the system through narrower spaces, such as doorways or hallways.

The system may also include a seat to support a user within or partially within the inner space. For instance, a seat may be a hammock suspended at least partly from a lateral support. Alternatively, the seat may be a chair that is removable from the inner space before transporting the system from one location to another location. One or more tracks may be associated with the system to guide position of the seat within the inner space. Alternatively, the chair may remain attached to the structure and within the inner space during transport. In some embodiments, the inner space will be wide enough to accommodate a wheelchair.

In some embodiments, the system includes at least one hinge connecting a supplemental frame to one of the support frames. The supplemental frame may be removably secured to a lateral support member. When the supplemental frame is extended to open position for transport, it enhances rollability of the system. When the supplemental frame is jackknifed or in closed position with respect to the support frame, it provides more stable footing support for the system when the system is supported on a support surface. The system may further include at least one caster or wheel on which the system may be rolled for transport.

In yet a further embodiment, a knock-down positioning, supporting and transporting system has support frames defining a rollable periphery, with one or more lateral supports connecting the support frames in spaced apart relation to define an inner space between support frames. The support frames are formed from a series of frame segments that are removably joined together to form the reliable periphery as a polygonal shape. When the system is disassembled and the support frame segments are separated from one another, the support frame segments may be aligned adjacent one another to define a carrier space. The carrier space may form a wheeled cart by placing the disassembled support frame segments on a shelf associated with a wheel.

BRIEF DESCRIPTION OF THE FIGURES

Novel features and advantages of the present invention in addition to those noted above will become apparent to persons of ordinary skill in the art from a reading of the following detailed description in conjunction with the accompanying drawings wherein similar reference characters refer to similar parts and in which.

DETAILED DESCRIPTION OF THE INVENTION

Figure 2:
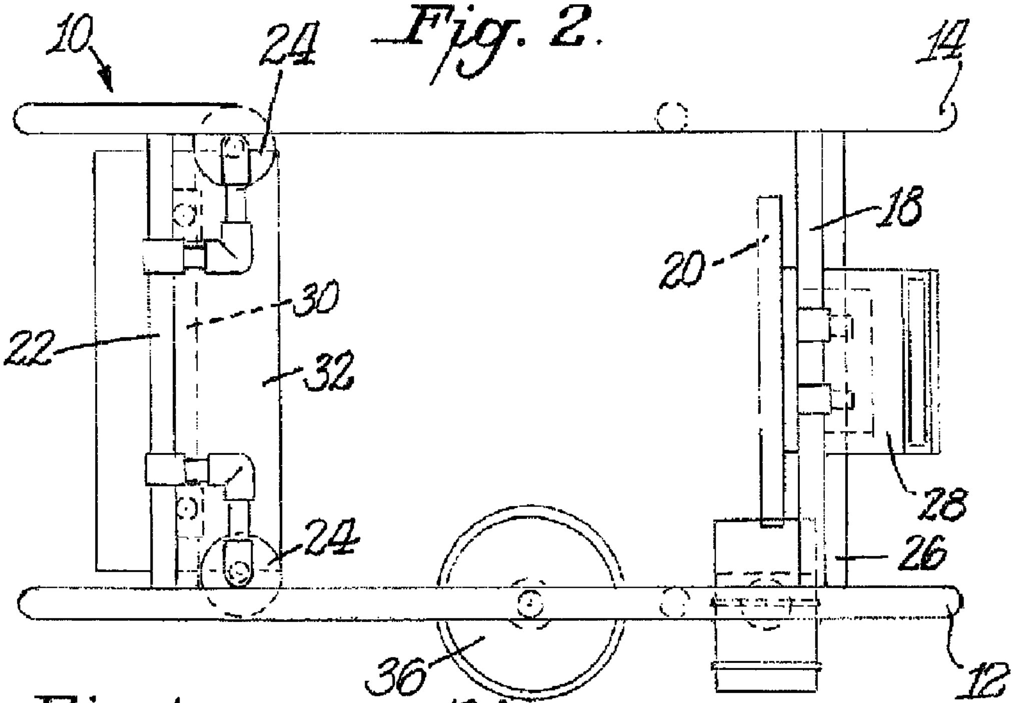
FIG. 2 is a top plan view of the system of FIG. 1.
Figure 1:
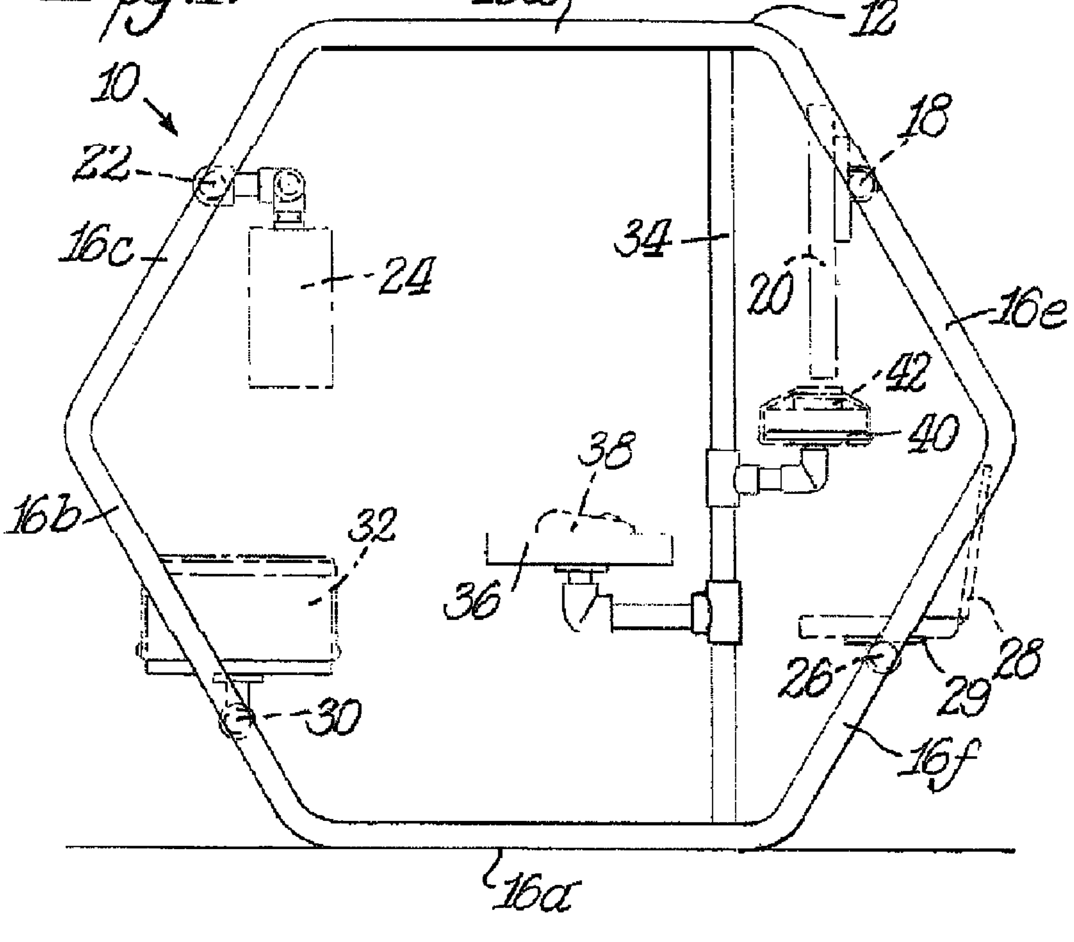
FIG. 1 is a left side elevational view of a transportable workstation system with hexagonal frame supports according to a first embodiment of the invention.
Figure 3:
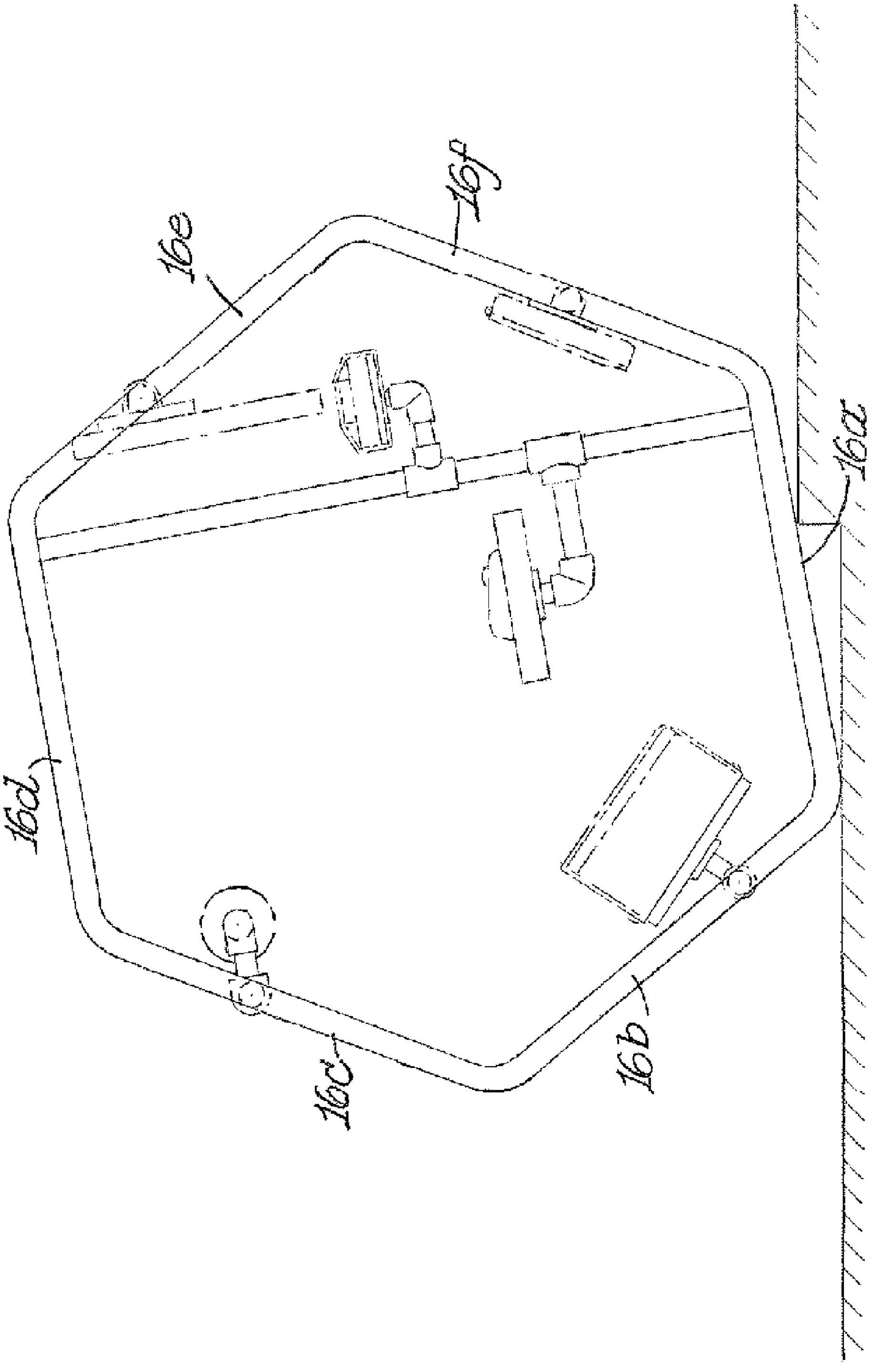
FIG. 3 is a left side elevational view of the system of FIG. 1 in which the system is being translated to a new location by rolling end-over-end.

Referring first to FIGS. 1-3, a positioning, supporting and transporting system 10 has a first support frame 12 and a second support frame 14 having rollable outer peripheries. Each support frame 12, 14 has six sides 16*a-f*, and forms a generally hexagonal shape. In this embodiment, a series of four lateral supports 18, 22, 26 and 30 join the first and second support frames 12, 14 together. The lateral supports have a length sufficient to form an inner space between the support frames 12, 14, wherein said inner space is suitable to accommodate a user therewithin.

As shown in FIG. 1, each support frame 12, 14 is resting stationary on one of the flat sides 16*a* of the hexagonal periphery. The support frames 12, 14 are considered to have rollable outer peripheries because the frames may be rolled end over end along the outer periphery from one flat side 16*a* to the next flat side 16*b* (see FIG. 3).

Various electronic accessories are shown in association with the system 10. A computer monitor or video monitor 20 is mounted to lateral support 18. A notebook computer is held on a shelf 29 mounted to lateral support 26. A computer hard drive or a power supply 32 may be installed on a shelf 31 mounted to lateral support 30.

In addition, vertical support 34 joins together two opposite sides 16*a*, 16*d* of the first support frame 12 together. A shelf 36 mounted to the vertical support 34 holds a computer mouse or game control 38. A shelf 40 mounted to the vertical support 34 holds another accessory 42, such as a cellular telephone or other telephone.

Other accessories (not shown) may include audio speakers, microphones, audio and digital signal processing devices, RF transmitters, light sources, computer printers, battery backups, computer keyboards, video game consoles, automated teller machines, currency dispensers, voting machines, plumbing fixtures, and electrical or mechanical devices for medical, therapeutic, rehabilatory purposes and other applications that require objects or persons to be suspended, positioned or transported.

A set of caster wheels 24 are mounted to another lateral support 22. In some circumstances it may be desired to move the system 10 by extending the caster wheels 24 outside of the frame supports 12, 14, and supporting the system 10 on said caster wheels 24. Caster wheels 24 are shown in FIGS. 1-3 with lockable arms in position within the inner space of the system 10 rather than extended outside of the inner space to support the system 10 for caster wheel rolling movement. Alternatively, caster wheels might be mounted to one or both of the support frames 12, 14.

Mounting means for the shelves 29, 31, 36 and 40 include sleeves or slip on fittings over the supports 12, 14, where the sleeves have associated pivotable arms that may rotate to various positions. Such pivotable arms permit a user within the system 10 to locate accessories in desired positions within and outside of the inner space defined between the first and second support frames 12, 14. In addition to shelves, arm rests and other support surfaces may be associated with the system 10.

Figure 6:
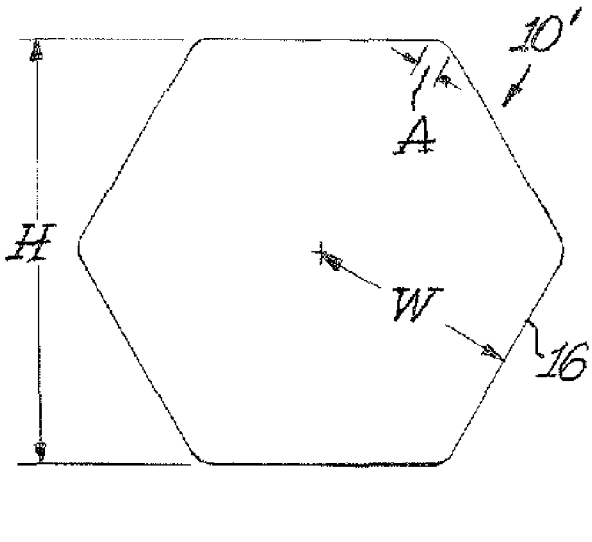
FIG. 6 is a side elevational view of a hexagonal frame support.

FIG. 6 shows a hexagonal frame structure 10' having a height H, a width W from center point of a frame support to midpoint of a hexagonal flat side 16 and an angle spacing A where two side segments are joined together. To create a system 10 suitable for use by most adult users, the height H is in the range of 36 to 72 inches, the width W is in the range of 15 to 31 inches, and the angle spacing A is in the range of 2 to 4 inches. Increasing the angle spacing results in a shorter segment width and thus a less stable base in resting position, making structures with a greater angle spacing more suitable for transportation applications.

The hexagonal frame structure 10' may be smooth or slotted pipe, tubing, bar stock or other extruded profile formed of various high strength materials, including polystyrene, polypropylene, metals, metals coated with insulation materials, or cross-linked or injection molded plastics or other materials durable enough to bear the structure plus any intended load may be used. Structural materials may be covered with a lightweight, shock-resistant housing for attaching peripherals, electronic ports, electrical components or outlets or other devices or mechanisms. The segments forming the support frame structure may have various cross-sectional shapes, including round, oval, square, rectangular, split oval, or other closed, slotted or custom extrusion profiles. An extruded profile system having a slotted profile, such as various profile systems available from MK Automation Inc. may be suitable. In some embodiments, the segments forming the support frame may be fully or partially coated or wrapped with shock absorbing or insulating material, such as rubber, polymeric material or polyurethane foam.

Figure 5:
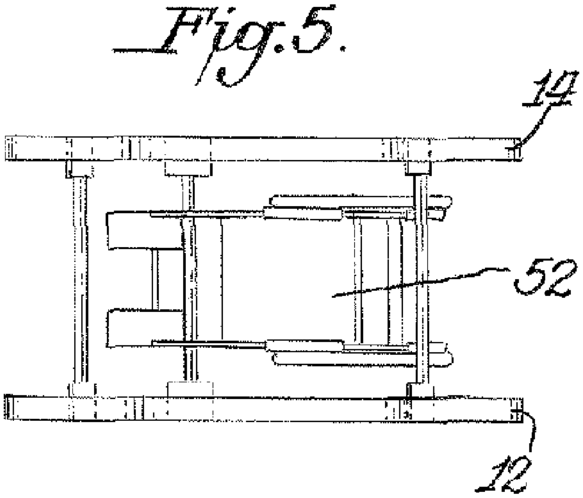
FIG. 5 is a top plan view of the system of FIG. 4.
Figure 4:
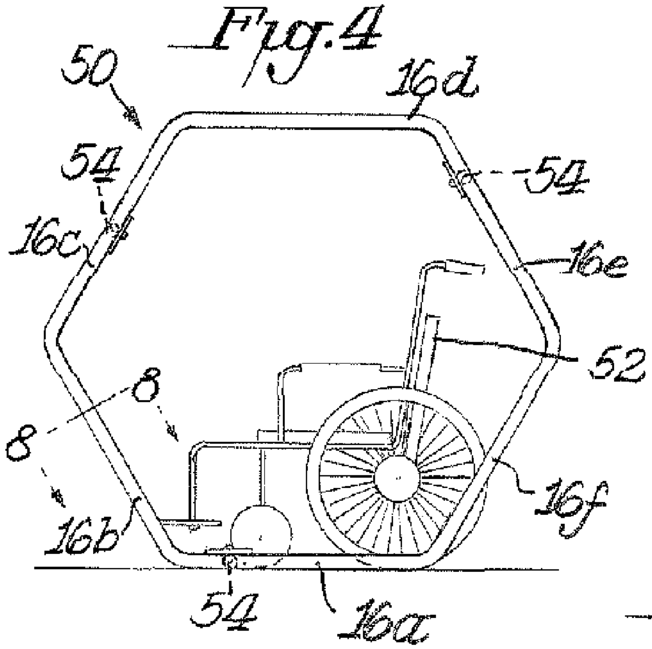
FIG. 4 is a left side elevational view of a transportable workstation system with hexagonal frame supports according to a second embodiment of the invention.

Referring next to FIGS. 4 and 5, an alternate embodiment of the positioning, supporting and transporting system 50 has an inner space to accommodate a wheelchair 52. A user seated on a wheelchair 52 may use the system 50 as a workstation or as a physical therapy or exercise station. For instance, the user may grab and pull up on the first and second frame supports 12, 14, using upper body strength to transport him or herself from a wheelchair or other mobility device to a more comfortable seating solution or, alternatively, to a suspended position for washing, personal hygiene or therapeutic purposes. Alternatively, exercise apparatus (not shown in FIGS. 4 and 5) or apparatus to assist in the washing or lifting of disabled persons or rehabilitating patients may be installed within the inner space of the system 50 or attached to the upright or lateral supports.

Figure 9:
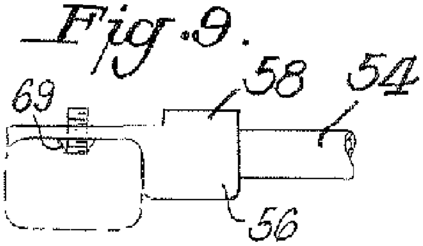
FIG. 9 is a side elevational view of a clamp over a frame support, where such clamp has an associated lateral support extending therefrom.

Such a system 50 includes three lateral supports 54 joining a first frame support 12 to a second frame support 14. The supports 54 (shown in more detail in FIG. 9) are generally tubes or bars held to the segments of the frame supports by clamps 56. Slip-on fittings (shown in more detail in FIG. 7) or clamp fittings 56 (shown in more detail in FIG. 33) are used to securely attach lateral supports or accessories to the frame supports segments. Clamps 56 grip around the frame support segments.

Figure 8:
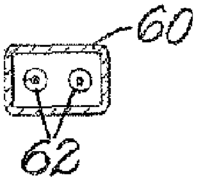
FIG. 8 is a cross sectional view of a support taken along line 8-8 in FIG. 4.

In the embodiment shown in FIGS. 4 and 5, the multiple segments of the first frame support consist of hollow tube members with slots to accommodate set screws and threaded washers or blocks. FIG. 8 shows the tube member 60 formed as a rectangular tube with a hollow core. The segments or tube members 60 may be formed of various high strength materials, including polystyrene, polypropylene, metals, metals coated with insulation materials, cross-linked or injection molded plastics or other materials durable enough to bear the structure plus any intended load. Structural materials may be covered with a lightweight, shock-resistant housing for attaching peripherals, electronic ports, electrical components, plumbing fixtures or other devices or mechanisms. Molded, rolled or extruded pipe, bar, or tubing may be used.

It is possible to string power cords, electrical cable, gas or water piping, strength enhancing wire, elastic cording or roping 62 through the hollow core of the frame segments 60 as shown in FIG. 8. For example, high voltage power cable can be run through one upright support while low-impedance audio or data wiring may be run through the other upright support, thereby providing spatial separation necessary to minimize electromagnetic interference.

As one alternative, the frame segments 60 may be formed of sections of straight tubing joined together at corners to form a polygonal shape, such as the hexagonal shape in FIG. 4. As another alternative, the frame segments 60 may be pre-formed with bends at predetermined angles. For example, each of three frame segments may be formed with two bends of 60 degrees each, whereby when the ends of such frame segments are joined together a hexagon is formed. With this alternative, a joining sleeve 66 or a clamp mechanism (shown in more detail in FIG. 33) may be used to join the ends of such frame segments together in straight alignment.

Figure 7:
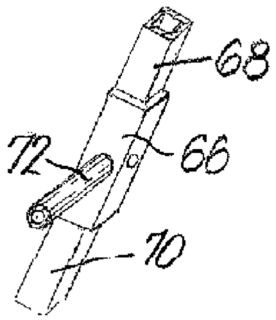
FIG. 7 is a perspective view of a sleeve fitting for linking frame support segments together.

FIG. 7 shows one example of a joining sleeve 66. Such sleeve permits the tubular ends 68, 70 of two frame segments to be inserted therein and held in abutting relation by means of a set screw 69. Transverse tube or pipe extension 72 is provided to hold a lateral support. Where joining sleeve 66 is a slip on fitting rather than a clamp fitting, additional set screws (not shown in FIG. 7) can be associated with the joining sleeve 66 to grip the tubular ends 68, 70. The sleeve may alternatively have a slotted profile. One example is a split oval with a first dimension in cross-section of about 3 to 4 inches, a second dimension in cross-section of about 2 inches, and a material thickness of about 0.1 to 0.2 inch. With a sleeve of such dimension, the extension 72 may have an outer pipe diameter of about 1 to 1.5 inch.

Lateral supports 54 may be collapsible, to shorten the distance between first frame support and second frame support. In one embodiment, lateral supports 54 may include a telescoping tube within a tube of wider diameter. (Refer to FIG. 33 for more detail for one embodiment of a telescoping lateral support.) In another embodiment, lateral supports 54 may include associated hinge or bending means to permit the otherwise extended support or tube to be shortened. Upon collapsing such lateral supports 54, the inner space of the system 50 may be closed or narrowed to take up less space for storage, or to reduce the size where wheelchair access is no longer necessary, or to permit transporting the system 54 through a doorway or narrow entryway or hallway.

Figure 14:
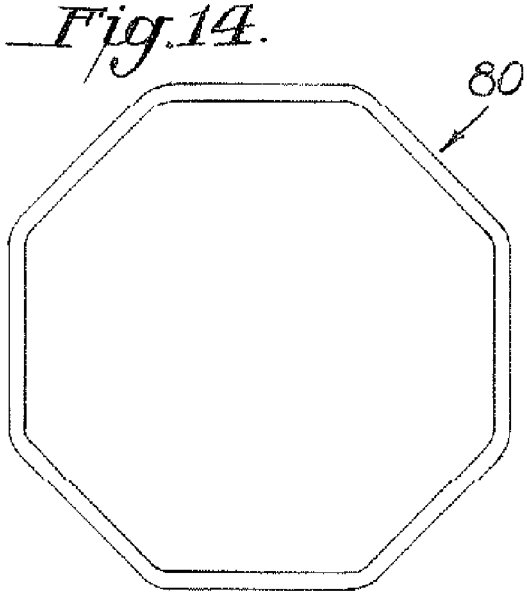
FIG. 14 is a left side elevational view of an octagonal frame support according to a fourth embodiment of the invention.

FIG. 14 shows a support frame 80 having an alternative polygonal shape—that of an octagon. Various polygonal shapes are possible, so long as the support frame has a rollable outer periphery and provides a stable working position. Thus, the invention is not limited to support frames having any specific polygonal shape. A polygon in which all adjacent angles to all sides are obtuse, where at least one side is straight to provide support as a stable working position when the system rests on such straight side functions well.

Figure 15:
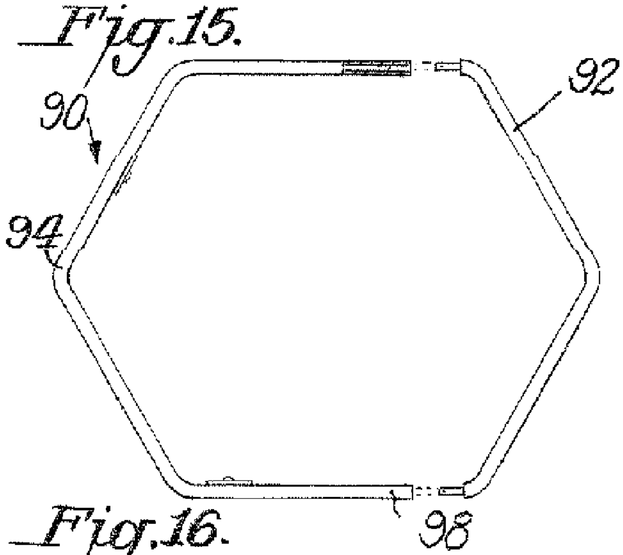
FIG. 15 is a left side elevational view, partially exploded, showing separating of a segment of the frame.

FIG. 15 shows a hexagonal support frame 90 formed of at least two frame segments 92, 94. Segment 92 comprises two flat sides joined at a 60 degree bend and two ends at 60 degree bends. Segment 94 comprises two flat sides joined at a 60 degree bend, with two other flat sides joined to the opposite ends of the first flat sides at 60 degree bends. As shown in FIG. 15, segment 94 comprises a generally hollow tube, and segment 92 has mating portions 96 that fit within the hollow tube ends of segment 94. Detents 98 help to hold the mating portions 96 within the hollow tube ends of segment 94. Joining sleeves 66 or joining clamps 56 may also be used to hold the connection.

Figure 16:
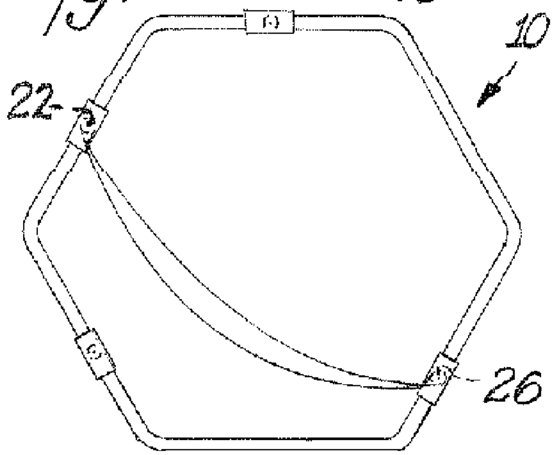
FIG. 16 is a left side elevational view of yet another alternative embodiment to the system of FIG. 1 into which a sling or hammock is suspended.

FIG. 16 shows a sling or hammock 100 or seat suspended at each end from lateral supports 22, 26 of a system 10. By rotating the apparatus so that it rests on a different frame segment, the resting position of the user occupying the hammock can be changed.

Referring next to FIGS. 10 to 13, yet another embodiment of the positioning, supporting and transporting system 110 shows a computer workstation. In this system 110 a user 112 is seated upon a seat 114 brought within the inner space of the system 110. The system 110 has a first support frame 116 and a second support frame 118 joined together by four lateral supports 120, 122, 124 and 126. First and second support frames 116, 118 have a generally oblong or egg-shaped outer periphery 128, with a flat portion 130 for stable stationary support of the system 110. The first and second support frames 116, 118 have rollable outer peripheries because upon rolling the frames forward onto the curved front portion, the frames will continue to roll over the remaining curved portion until reaching the flat portion 130.

Additional support sections may be provided to join opposing frame sections for added stability or to support accessories. For example, a series of vertical supports 132, 134 can be included to join the flat portion 130 to the curved portion 128 of the first support member 116 for added stability. Similar vertical supports may be provided to join the flat portion 130 to the curved portion 128 of the second support member 118. In addition a Y-shaped support 136 may extend from lateral support 122 at its base to the first support member and the second support member, respectively, at each tip of the Y.

Figure 11:
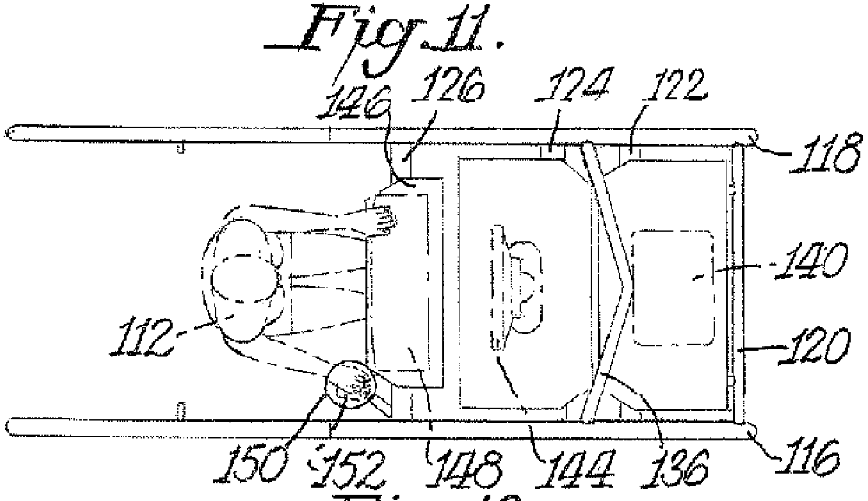
FIG. 11 is a top plan view of the system of FIG. 10.
Figure 10:
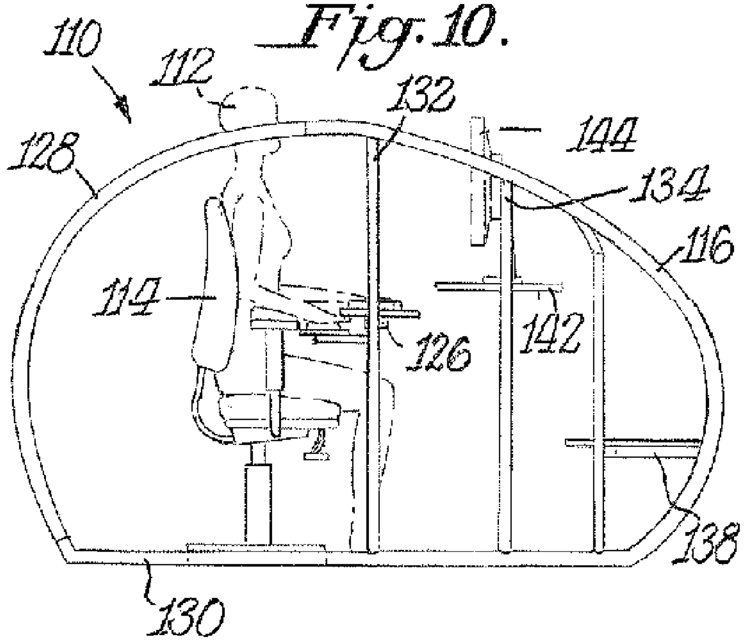
FIG. 10 is a left side elevational view of a transportable workstation system with elliptical frame supports according to a third embodiment of the invention.
Figure 12:
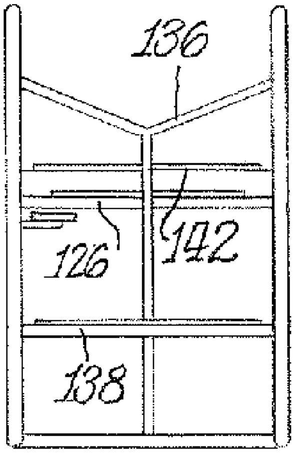
FIG. 12 is a front elevational view of the system of FIG. 10.

As shown in FIGS. 10, 11 and 12, various mounts may be installed for accessories. For example, a shelf 138 may be mounted to lateral support 122 to hold a computer hard drive or power supply 140. Another shelf 142 may be mounted to lateral support 124 to hold a computer monitor or video display 144. In addition, a shelf 146 may be mounted to lateral support 126 to hold a computer keyboard or video console 148. Auxiliary shelf 150 is shown mounted to vertical support 132 to hold a computer mouse or joystick 152.

As shown in FIG. 10, the user 112 is seated within the inner space of the system 110, but her head extends above the height of the first and second support frames 116, 118. She has adjusted the computer monitor 144 to a height that is also partly outside of the inner space of the system and above the height of the first and second support frames 116, 118. When the computer workstation 110 is to be moved to a new location, the seat 114 can be removed from the inner space, and the monitor 144 can be lowered to be completely within the inner space of the system 110, so that the monitor will not be damaged when the system 110 is moved by rolling to a new location.

Before rolling the work station or system 110 to a new location, accessories preferably should be clamped, tied or otherwise secured to the mounts or shelves within the inner space of the system 110.

Figure 13:
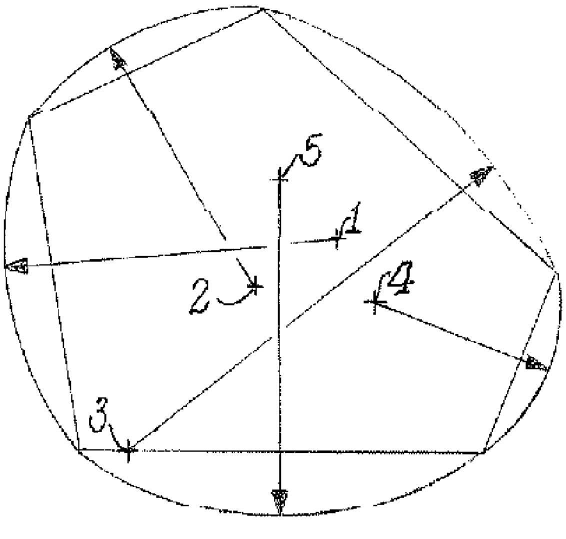
FIG. 13 is a diagram of the elliptical frame showing dimensions and angles.

In FIG. 13 points 1 to 5 are centerpoints for each of the arcs comprising the individual frame support sections. Arc centerpoints can be at positions within the periphery of the frame support as shown in FIG. 13. Alternatively, arc centerpoints can be at positions outside the periphery of the frame support. Whatever arc centerpoints are chosen, the frame support should be rollable, and preferably should have obtuse angles between the straight chords that may be drawn between points where the adjacent arc portions intersect.

Figure 17:
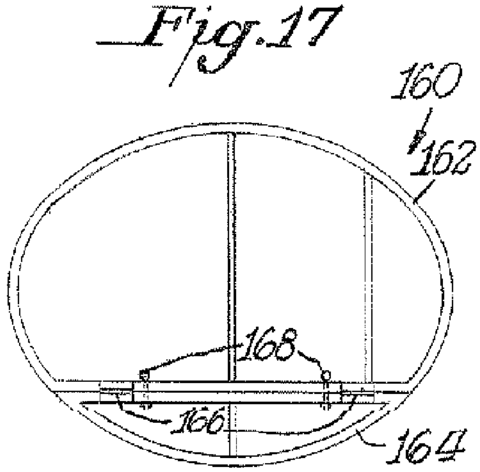
FIG. 17 is a left side elevational view of the system of FIG. 10 showing hinge structure for the frame positioned for translational movement of the system.
Figure 18:
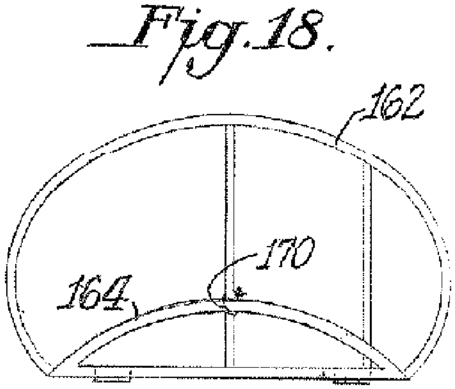
FIG. 18 is a left side elevational view of the system of FIG. 10 showing hinge structure for the frame positioned for storage or stationary position.
Figure 19:
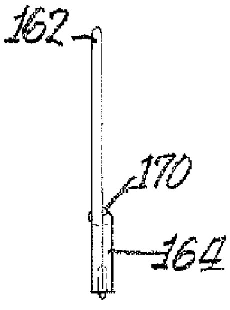
FIG. 19 is a front side elevational view of the system of FIG. 18.

Referring next to FIGS. 17 to 19, a system frame 160 alternatively may be formed with an outer periphery that has an oval or oblong shape. The frame support shown in FIG. 17 has a first section 162 with an oblong or oval shape with a flat bottom portion. The second section 164 has an arcuate side and a flat side. The second section 164 is connected to the first section 162 by hinges 166 and removable pins 168. When the system with such frame supports 160 is to be rolled for movement to a new location, hinges 166 are opened and pins 168 are inserted through holes in the flat portions of frame section 162 and frame section 164 to form an oval or oblong outer periphery as shown in FIG. 17. When the system with such frame supports 160 is to be used as a work station or in a fixed position, stable so that it does not roll or wobble, the pins 168 may be removed, and the hinges 166 closed as shown in FIGS. 18 and 19. With the hinges 166 closed, the flat portion of frame segment 162 maintains contact with a support surface, such as a floor or the ground, to hold the system in stable position. A tie, Velcro fastener or fastener hardware 170 may be supplied to hold the frame segment 164 to a vertical support associated with the support frame segment 162.

Figure 20:
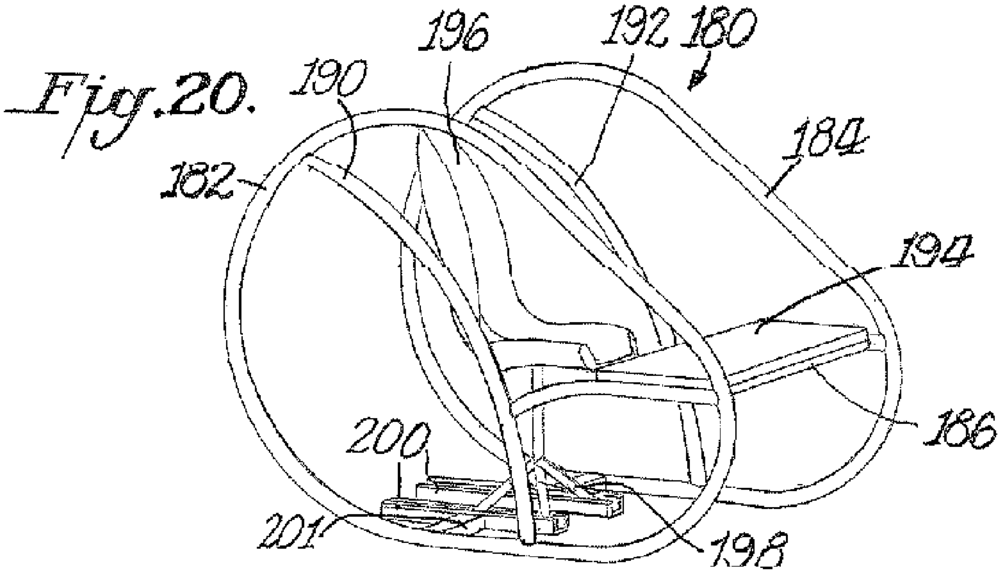
FIG. 20 is a perspective view of a transportable workstation system with elliptical frame supports according to a fifth embodiment of the invention.

FIG. 20 shows yet another embodiment of the invention in which the system 180 has frame supports 182, 184, each with a generally oblong or elliptical shape. The frame supports are joined together by lateral supports 186, 188. In addition, curved, generally inverted Y-shaped supports 190, 192 join segments of an individual frame support 182, 184 together. A mount or shelf 194 is connected or attached to lateral support 186 to support a computer system, a video game console, or other accessory. A user may sit in a seat or chair 196 brought within the inner space of the system 180. As shown in FIG. 20, seat 196 has legs 198 that slide within channels or tracks 200. Such channels or tracks 200 may be integrally attached to the frame supports 182, 184 such as by lateral struts 201 or may be separate from the system. Where the channels or tracks are integrally attached as shown in FIG. 20, the length of the channels or tracks 200 should not interfere with rollable transport of the system 180, or if the length extends beyond the periphery of the frame supports, the channels or tracks 200 should have means to shorten the length (such as a telescoping section) so that the shortened length does not interfere with rollable transport of the system 180.

The shape of the frame supports 182, 184 is unique in that two flat portions are separated by two curved portions, where one curved portion has a larger radius of curvature and the other curved portion has a much smaller radius of curvature. This particular oblong shape permits one to roll the system 180 by tipping forward to the smaller radius of curvature portion. However, unlike a circular or oval shaped frame, the flat portions make it easier for a user to control the rolling motion as the system is rolled to a new location.

Figure 21:
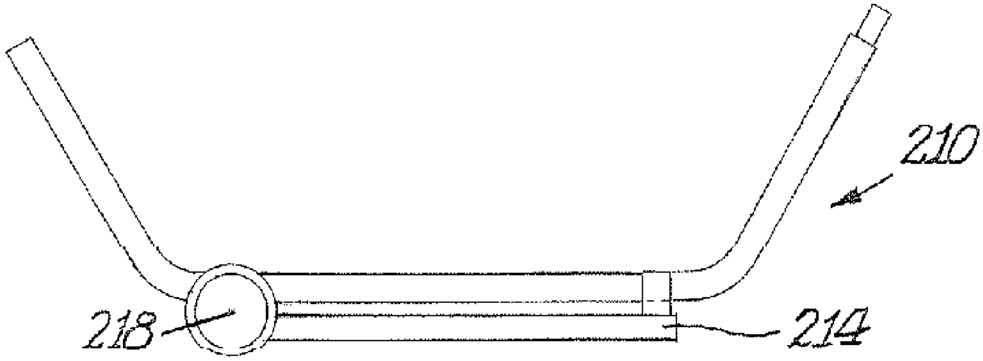
FIG. 21 is a left side elevational view of a cart formed with disassembled hexagonal frame segments.
Figure 22:
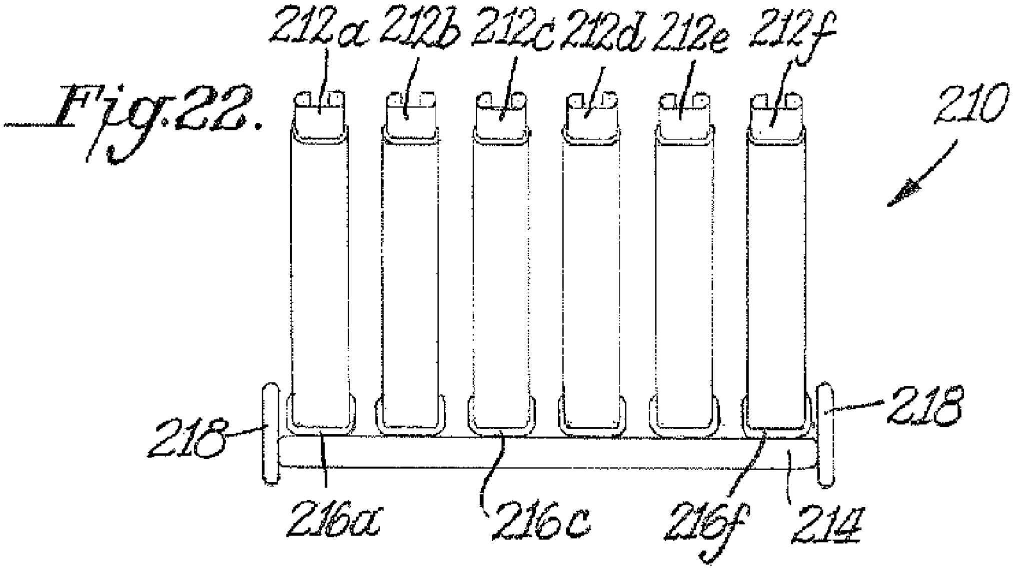
FIG. 22 is a front elevational view of a cart formed with disassembled hexagonal frame segments.

In one embodiment of the system, the frame supports 16 may be disassembled and arranged so as to form a container or cart for storing and transporting the remaining structure and accessories of the system. FIGS. 21 and 22 show a cart 210 formed by aligning segments 212*a-f* of a support frame from a system (such as system 10) side-by-side on a support shelf or structure 214. Support shelf 214 has a series of holders 216*a-f* to removably receive a segment 212*a-f*. Support shelf 214 further defines an opening for an axle or wheel mount (not shown) to which one or more wheels or casters 216 may be engaged for rollable connection to the shelf 214. Upon disassembling the system 10, a cart 210 then may be assembled in which optionally to hold the remaining frame segments, fasteners, shelves mounts, lateral supports, vertical supports and accessories for storage or further transport.

Figure 23:
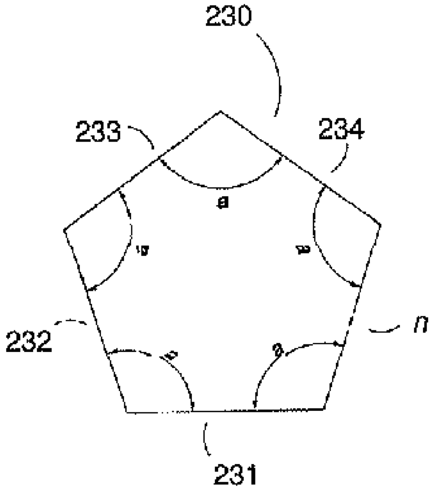
FIG. 23 is a side elevational view of a pentagonal frame support.

FIG. 23 shows a frame support 230 for a mobile system and apparatus for positioning people and for supporting, positioning and transporting objects that is based upon a regular polygon with five sides n, 231, 232, 233, and 234. The side n represents an adjacent side to a side 231, where side 231 would form a base portion in a system using this frame support 230 if oriented as illustrated in FIG. 23. Because the frame support 230 is a regular polygonal shape with multiple equivalent length sides, any side could alternatively serve as the base portion and allow the system to remain in a stable working position. The angle a between side n and side 231 is 108 degrees. The angle a between each adjacent side is 108 degrees in this regular five-sided polygon. Hence all angles a are obtuse.

Figure 24:
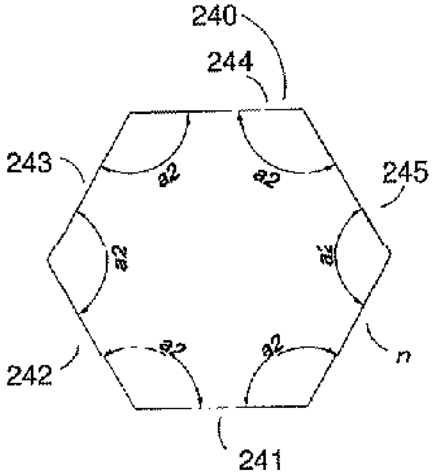
FIG. 24 is a side elevational view of an alternative hexagonal support.

FIG. 24 illustrates a frame support 240 for a mobile system and apparatus for positioning people and for supporting, positioning and transporting objects that is based upon a regular polygon with six sides n, 241, 242, 243, 244 and 245. The angles a2 between adjacent sides in this frame support are each 120 degrees. Hence all angles a2 are obtuse. As shown in FIG. 24, side 241 forms a base portion in a system using this frame support 240. Again, optionally any other side may be selected to form the base portion for the system where the frame support is a regular six-sided polygon such as shown in FIG. 24.

Figure 25:
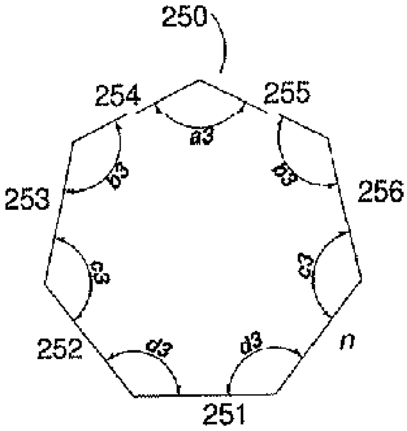
FIG. 25 is a side elevational view of a seven-sided frame support.

FIG. 25 illustrates a frame support 250 for a mobile system and apparatus for positioning people and for supporting, positioning and transporting objects that is based upon a regular polygon with seven sides n, 251, 252, 253, 254, 255 and 256. The angles a3 between adjacent sides in this frame support are each greater than 90 degrees. Hence all angles a3 are obtuse. As shown in FIG. 25, side 251 forms a base portion in a system using this frame support 250. However, any other side may be selected to form the base portion for the system where the frame support is a regular seven-sided polygon such as shown in FIG. 25.

Figure 26:
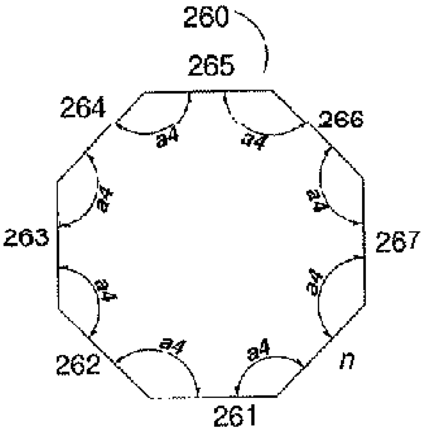
FIG. 26 is a side elevational view of an octagonal frame support.

FIG. 26 illustrates a frame support 260 for a mobile system and apparatus for positioning people and for supporting, positioning and transporting objects that is based upon a regular polygon with eight sides n, 261, 262, 263, 264, 265, 266 and 267. The angles a4 between adjacent sides in this frame support are each 135 degrees. Hence all angles a4 are obtuse. As shown in FIG. 26, side 261 forms a base portion in a system using this frame support 260. However, any other side may be selected to form the base portion for the system where the frame support is a regular eight-sided polygon such as shown in FIG. 26.

Figure 27:
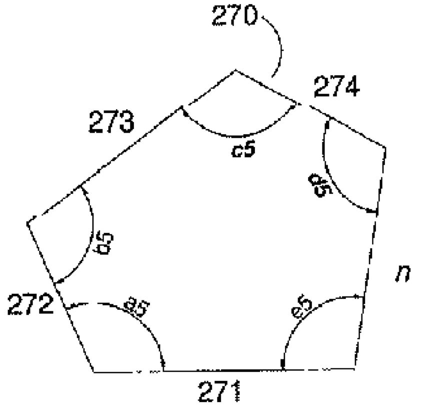
FIG. 27 is a side elevational view of a five-sided frame support.

FIG. 27 shows a frame support 270 for a mobile system and apparatus for positioning people and for supporting, positioning and transporting objects that is based upon an irregular polygon with five sides n, 271, 272, 273 and 274. The angles between adjacent sides vary, but each of angles a5, b5, c5, d5, and e5 is obtuse (greater than 90 degrees). As shown in FIG. 27, side 271 forms a base portion. Alternatively, one of the other sides might be selected to form the base portion. A system formed with two frame supports 270 would have a rollable periphery as intended within the scope of this invention.

Figure 28:
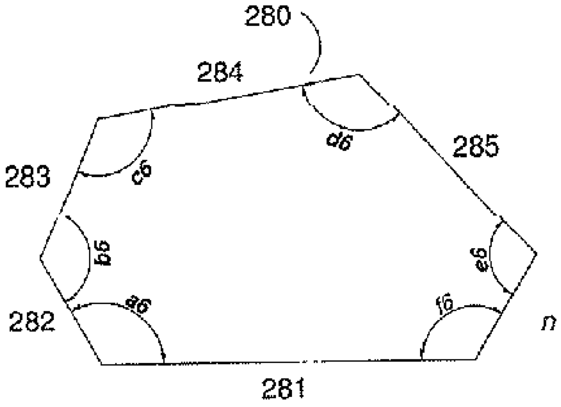
FIG. 28 is a side elevational view of a six-sided frame support.

FIG. 28 shows a frame support 280 for a mobile system and apparatus for positioning people and for supporting, positioning and transporting objects that is based upon an irregular polygon with six sides n, 281, 282, 283, 284 and 285. The angles between adjacent sides vary, but each of angles a6, b6, c6, d6, e6 and f6 is obtuse (greater than 90 degrees). As shown in FIG. 28, side 281 forms a base portion. Alternatively, one of the other sides might be selected to form the base portion. A system formed with two frame supports 280 would have a rollable periphery as intended within the scope of this invention.

Figure 29:
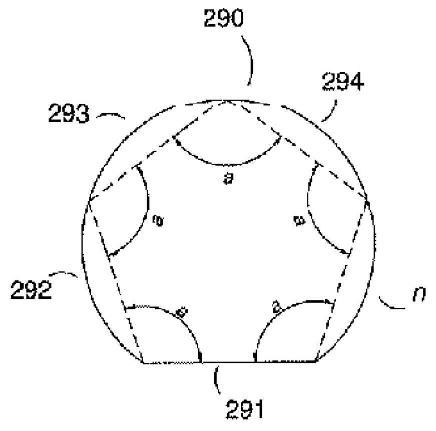
FIG. 29 is a side elevational view of a frame support having a base portion formed as a flat chord section of a pentagonal shape wherein the rollable portion is formed by joining endpoints of the pentagon with arc segments.

FIG. 29 shows yet another frame support 290 for a mobile system and apparatus for positioning people and for supporting, positioning and transporting objects. This frame support 290 has a base portion 291 and a remaining curved perimeter 296. The curved perimeter 296 is created essentially by joining together arc segments that begin and end at the end points of the sides of a regular five sided polygon with sides 291, 292 (shown in dash line), 293 (shown in dash line), 294 (shown in dash line), and n (shown in dash line). The angles a between the sides are all 108 degrees. A system formed with two frame supports 290 would have a rollable periphery as intended within the scope of this invention. Only the flat side 291 can be the base portion such that the system is in a working position when the flat side 291 is supported by the floor or other supporting surface. The curved perimeter 296 provides greater ease of rollability over a five-sided frame such as that shown in FIG. 23.

Figure 30:
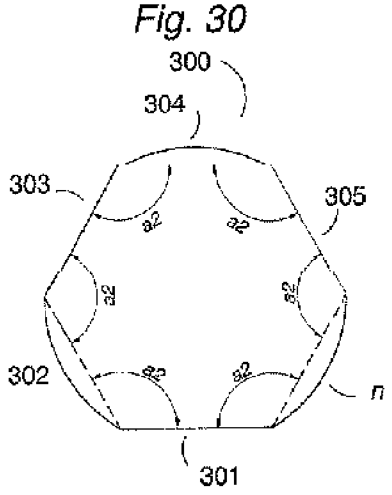
FIG. 30 is a side elevational view of a frame support having a base portion formed as a flat chord section of a hexagonal shape, wherein rollable portions are formed by joining endpoints of three alternate chord sections with arc segments.

FIG. 30 illustrates an alternative frame support 300 for a mobile system and apparatus for positioning people and for supporting, positioning and transporting objects. This frame support 300 has three flat sides 301, 303, 305 alternating between three curved sides n, 302, 304. Each of the curved sides is created essentially by an arc segment that begins and ends at the end points of the closest side of a regular six sided polygon (e.g., 302*a*, 304*a* and na shown in dash line). The angles a2 between the sides forming a six sided polygon are all 120 degrees. A system formed with two frame supports 300 would have a rollable periphery as intended within the scope of this invention. Only the flat sides 301, 303 and 305 could selectively be chosen as the base portion. The system would be in a working position when one of these flat sides 301, 303 or 305 is supported by the floor or other supporting surface. The curved sides n, 302, and 304 permit greater ease of reliability over the six-sided polygon frame shown in FIG. 24.

Figure 31:
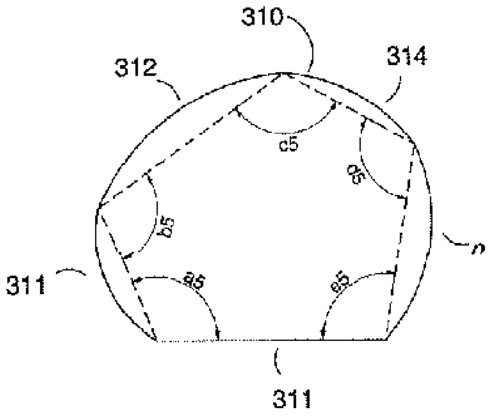
FIG. 31 is a side elevational view of a frame support having a base portion formed as a flat chord section of a five-sided shape, wherein the rollable portion is formed by joining endpoints of the remaining four sides with arc segments.

FIG. 31 shows yet another frame support 310 for a mobile system and apparatus for positioning people and for supporting, positioning and transporting objects. This frame support 310 has a base portion 311 and a remaining curved perimeter 316. The curved perimeter 316 is created essentially by joining together arc segments that begin and end at the end points of the sides of a five sided polygon with sides 311, 312 (shown in dash line), 313 (shown in dash line), 314 (shown in dash line), and n (shown in dash line). The angles a5, b5, c5, d5 and e5 vary, but all are obtuse (greater than 90 degrees). A system formed with two frame supports 310 would have a rollable periphery as intended within the scope of this invention. Only the flat side 311 can be the base portion such that the system is in a working position when the flat side 311 is supported by the floor or other supporting surface. The curved perimeter 316 provides greater ease of rollability over a five-sided frame such as that shown in FIG. 27.

Figure 32:
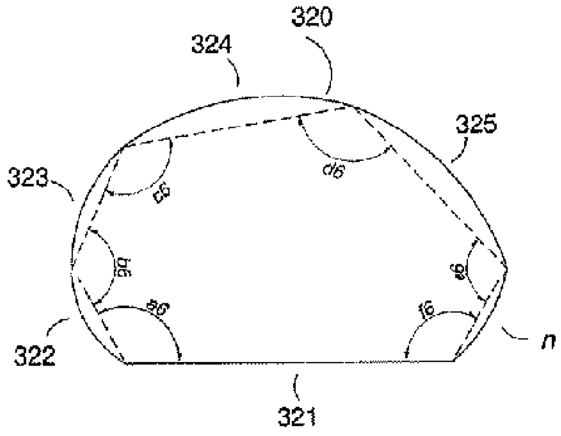
FIG. 32 is a side elevational view of a frame support having a base portion formed as a flat chord section of a six-sided shape, wherein the rollable portion is formed by joining endpoints of the remaining five sides with arc segments.

FIG. 32 shows another alternative frame support 320 for a mobile system and apparatus for positioning people and for supporting, positioning and transporting objects. This frame support 320 has a base portion 321 and a remaining curved perimeter 326. The curved perimeter 326 is created essentially by joining together arc segments that begin and end at the end points of the sides of a six sided polygon with sides 321, 322 (shown in dash line), 323 (shown in dash line), 324 (shown in dash line), 325 (shown in dash line) and n (shown in dash line). The angles a6, b6, c6, d6, e6 and f6 vary, but all are obtuse (greater than 90 degrees). A system formed with two frame supports 320 would have a rollable periphery as intended within the scope of this invention. Only the flat side 321 can be the base portion such that the system is in a working position when the flat side 321 is supported by the floor or other supporting surface. The curved perimeter 326 provides greater ease of rollability over a six-sided frame such as that shown in FIG. 28.

Figure 33:
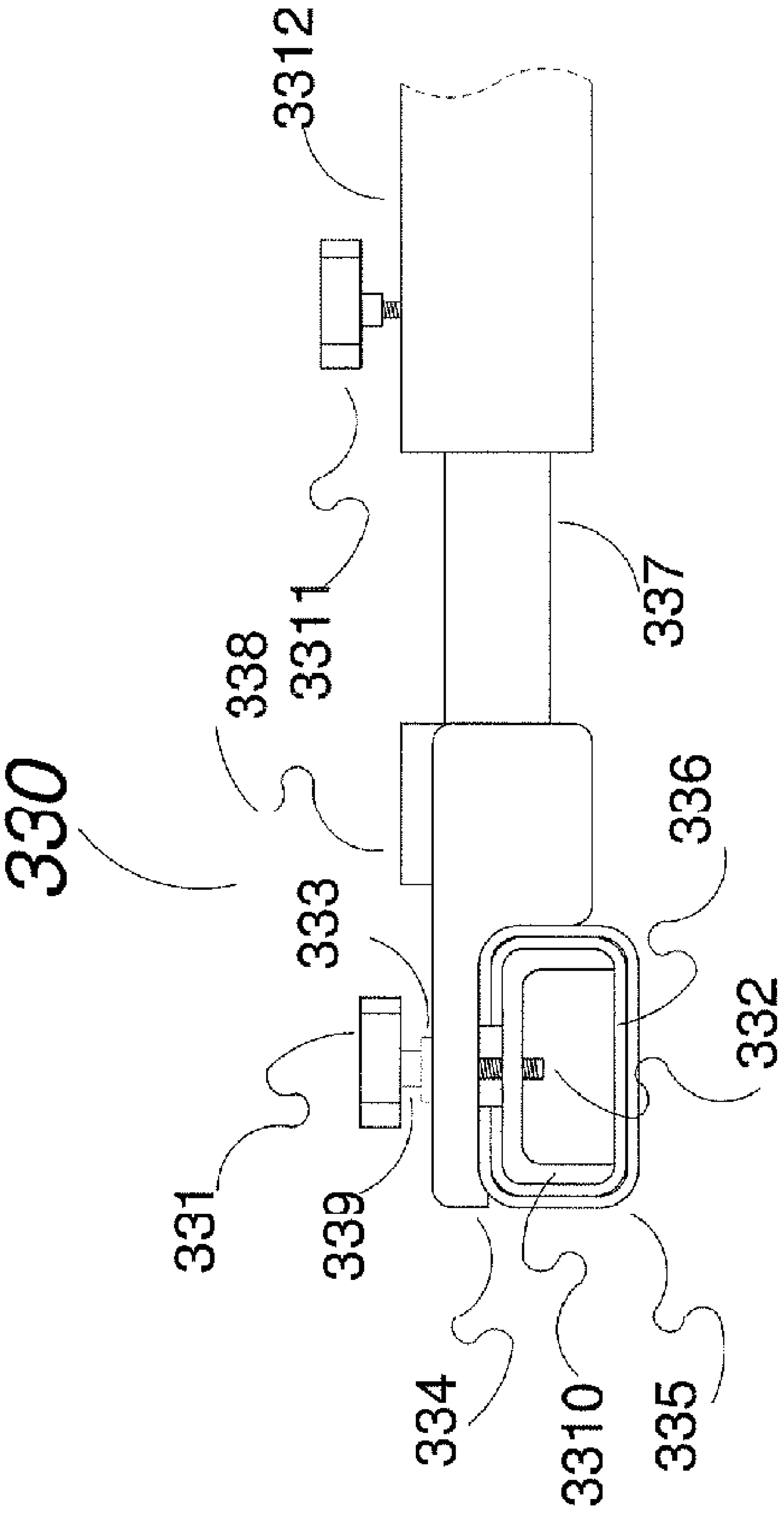
FIG. 33 is a front elevational view of a clamp engaged to a frame support.

Greater detail is provided in FIG. 33 for a clamp 330 for joining frame sections or attaching lateral support members to the frame or joining lateral support members together. The clamp 330 has a clamp body 304 through which a hole is bored to accommodate the threaded end 332 of a set screw with a knobbed head 331 for easy hand operation. Knobbed head 331 is connected to a cylindrical stop 339. Threaded end 332 of the set screw passes through washer 333, which serves to protect the surface of clamp body 334 against friction wear. Mounting bracket 3310 is inserted into frame splice connector 336 and placed at the position at which the joined frame segments will abut. Threaded end 332 is inserted into the bore in clamp body 334 and screwed into the threaded hole in the mounting bracket 3310. As the knobbed head 331 is turned, frame splice connector 336, frame section 335 and clamp body 334 are all drawn together until clamped securely in place.

This clamp 330 can be used to securely join two frame sections in abutting orientation. The clamp 330 shown in FIG. 33 can also be used to attach lateral support members to the frame. In FIG. 33, lateral support section 337 is inserted into a socket extension 338 and epoxied, glued, welded or otherwise secured therein. To join lateral support sections and create a complete, adjustable width lateral support member, a lateral support section 337 is inserted into one end of extension sleeve 3312 which is outfitted with a threaded hole to accommodate set screw 3311. Extension sleeve 3312 is fastened securely in place by hand-tightening the set screw 3311. Another lateral support section (not shown in FIG. 33) then may be inserted into the other end of extension sleeve 3312 and fastened as described, resulting in an adjustable width lateral support member for connecting to upright frame supports. In other words, the length of the lateral support may be shortened upon loosening the set screw 3311 and urging the lateral support sections further into extension sleeve 3312.

Figure 34:
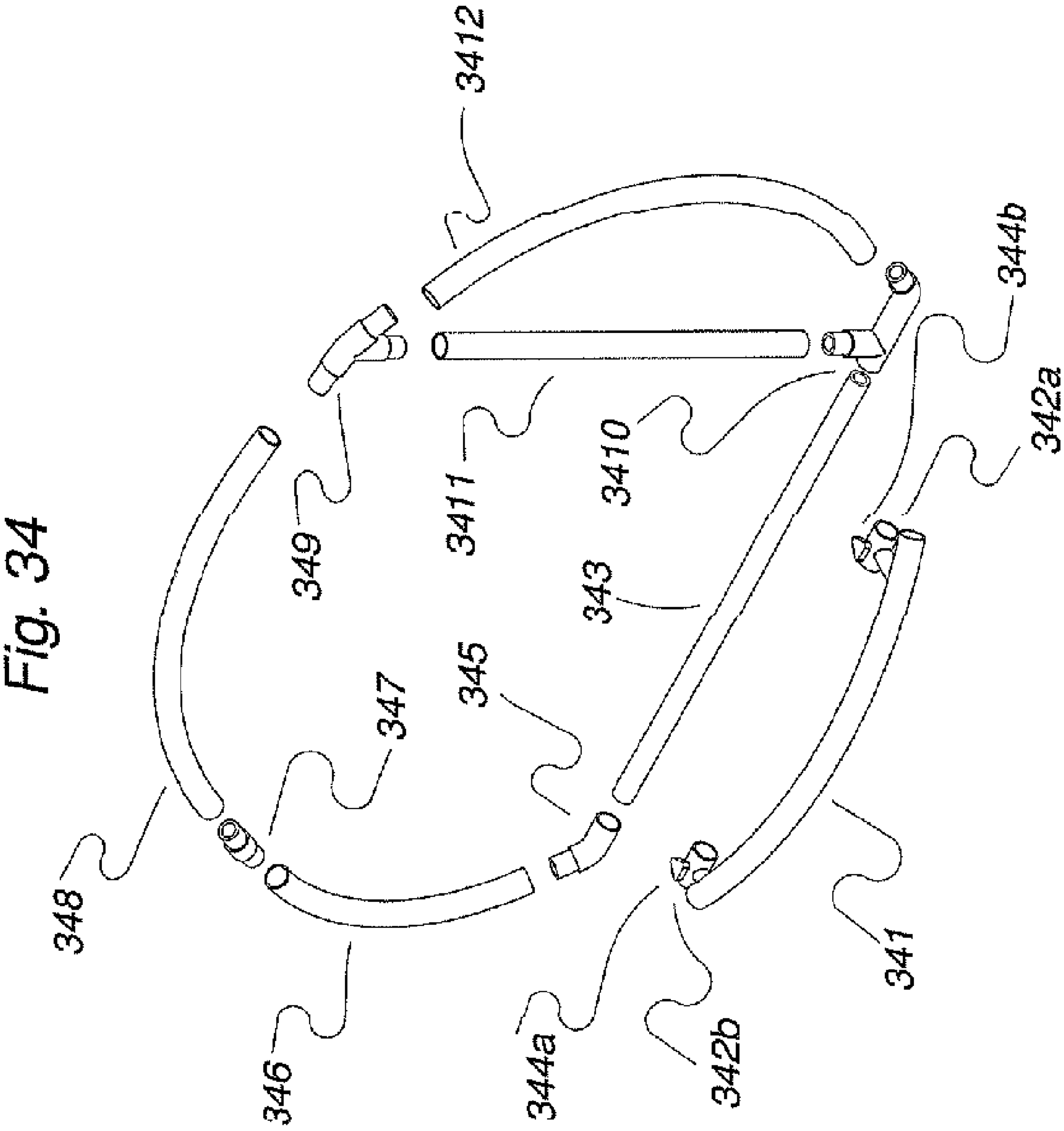
FIG. 34 is an exploded view of a frame support with a separable curved portion shown detached.

Referring next to FIG. 34, an alternate foot section 341 is a curved segment with two perpendicular extrusions onto which slip-on fittings 342*a* and 342*b* are attached. The fittings 342*a* and 342*b* slip over floor section or base portion 343 of the support frame so that foot section 341 and floor section 343 share a rotational X-axis. Foot section 341 is swivelable or freely turnable around floor section 341. While the system is in a working or stable stationary position, foot section 341 is locked in place horizontally against floor section 341 by means of set screws 344*a* and 344*b*. In this way foot section 341 stabilizes the upright frame supports of the system by preventing unwanted X-axis rotation of floor section 343, which would otherwise translate upward through the upright structure and result in wobbling or Z-directional leaning from the vertical X-Y plane. The horizontal support provided by foot section 341 also ensures a stable base while the system is being assembled. For transport or storage set screws 344*a* and 344*b* are loosened and foot section 341 is repositioned so that it occupies the same vertical orientation and plane as the upright system structure. When fixed in a downward facing position, foot section 341 completes the elliptical shape of the system periphery, allowing the system to roll freely.

Assembly of one example of a frame support is illustrated also with reference to FIG. 34. Fitting 345 is attached to floor section 343. Interior diameter of upright sections 346, 348 and 3409 match the outer diameter of the plug inserts in fittings 345, 347, 349 and 3410. The joints can be welded, epoxied, glued or, for quick disassembly and reassembly, connected using set screws set into threaded holes drilled into the plug inserts of fittings 345, 347, 349 and 3410, or other assembly methods. Upright sections 346, 348 and 3409 are attached to fittings 345, 347, 349 and 3410 as described. Upright support 3411 is similarly attached to the vertically oriented plug inserts of fittings 349 and 3410.

Figure 35:
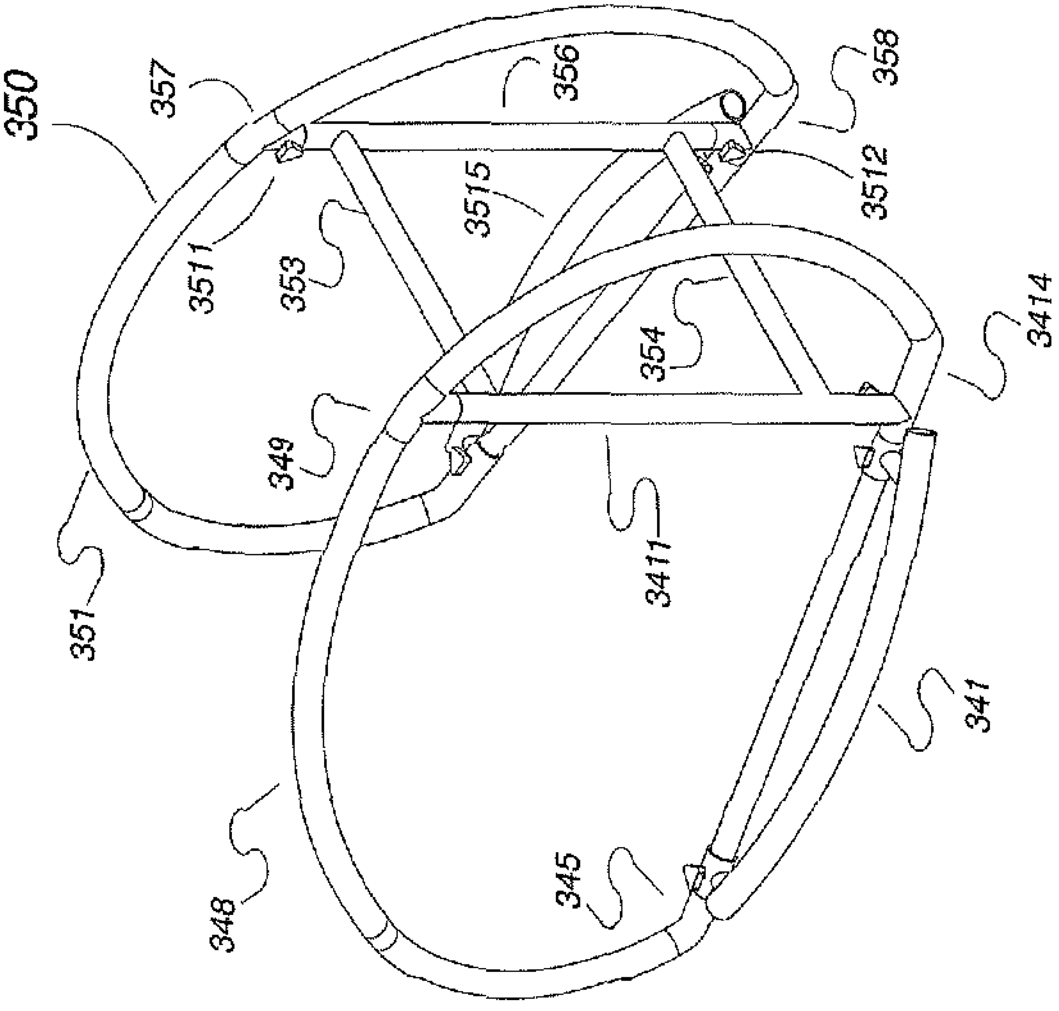
FIG. 35 is a perspective view of an embodiment of the system according to the invention with the frame support of FIG. 34.

FIG. 35 shows a system 350 having an elliptical frame structure with frame supports 351 and 348 joined by lateral supports 353 and 354, which lateral supports 353, 354 are connected to vertical supports 341, 356. Together, the lateral supports 353 and 354 and the vertical supports 341 and 356 form a one-piece lateral frame structure. The lateral frame structure slips over plugs (not shown in FIG. 35) in slip-on connection fittings 357, 358, 3414 and 349. Set screws 3511, 3512, 3513 and 3514 are tightened to hold lateral frame structure securely in the fittings 357, 358, 3414 and 349. Refer to FIG. 33 for greater detail of these slip on fittings. Slip on fittings 357, 358, 3414 and 349 function as a hinge mechanism that permits a user to set frame supports 351 and 348 at any X-Z angle with vertical supports 3411 and 356 acting as pivots or hinge pins. The footprint of the system as defined by spacing and orientation between frame supports 351, 348 is adjustable. A greater or smaller internal space between frame supports 351 and 348 can be accommodated as required or desired. In addition, portions of the frame supports may be spaced closer together or farther apart to thereby splay the frame supports at an angle rather than maintaining a spaced-apart parallel configuration. In this way, the system has been collapsed from its wider working position footprint to a narrower transport footprint that can fit through doorways, stairwells and other narrow corridors.

Figure 36:
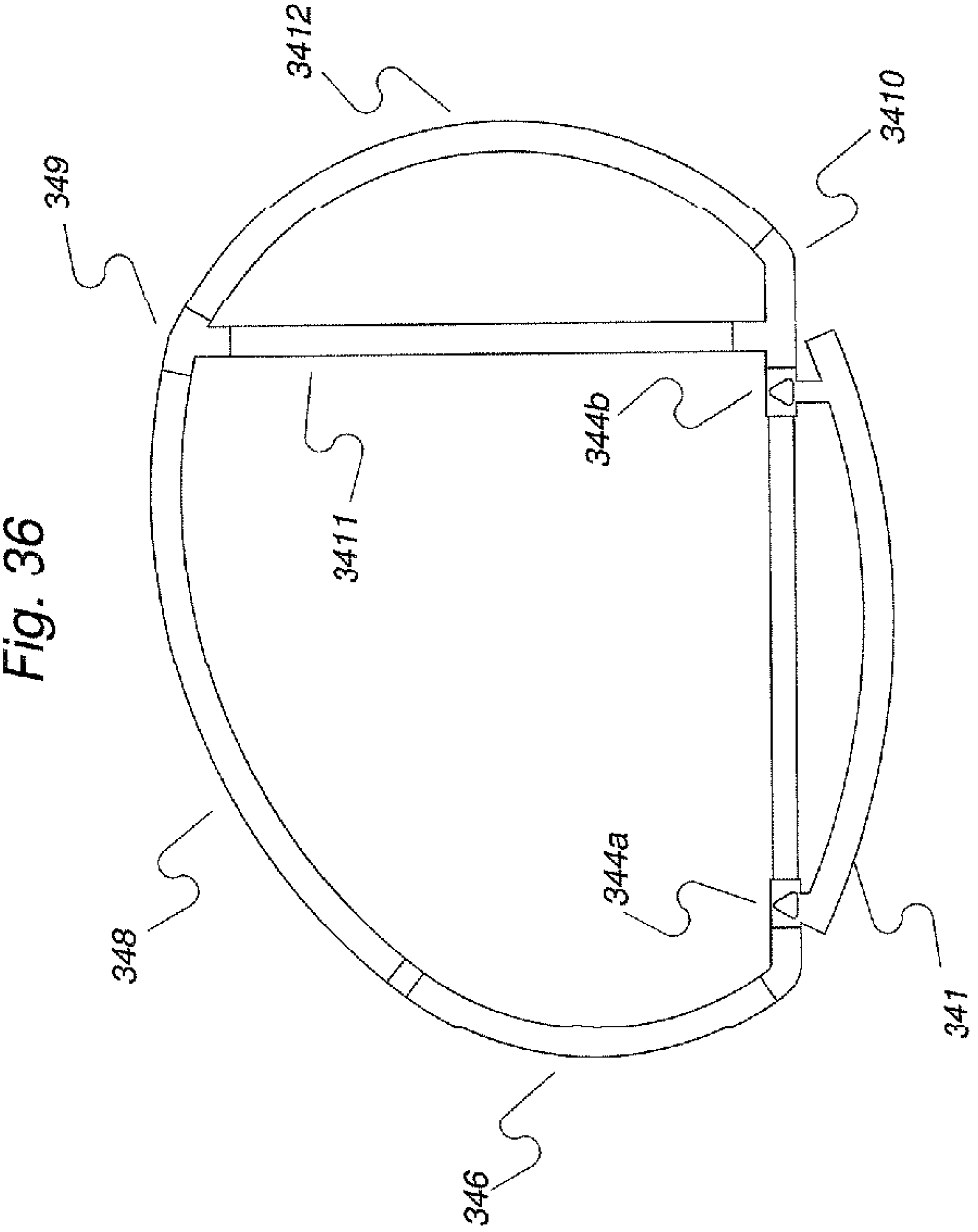
FIG. 36 is a front elevational view of the frame support of FIG. 34 with the separable curved portion shown attached for rollable translation of the system.

FIG. 36 shows a front elevation view of one of the frames of FIG. 35 in which the foot section 341 is positioned in a downwardly facing vertical orientation using set screws 344*a* and 344*b*. With the foot section 341 downward, the frame supports 346, 348, 3409 together with the foot section 341 define an ellipse. The system in this configuration (i.e., having both foot sections 341 and 3515 (not shown in FIG. 36) can be rolled along its periphery.

Figure 37:
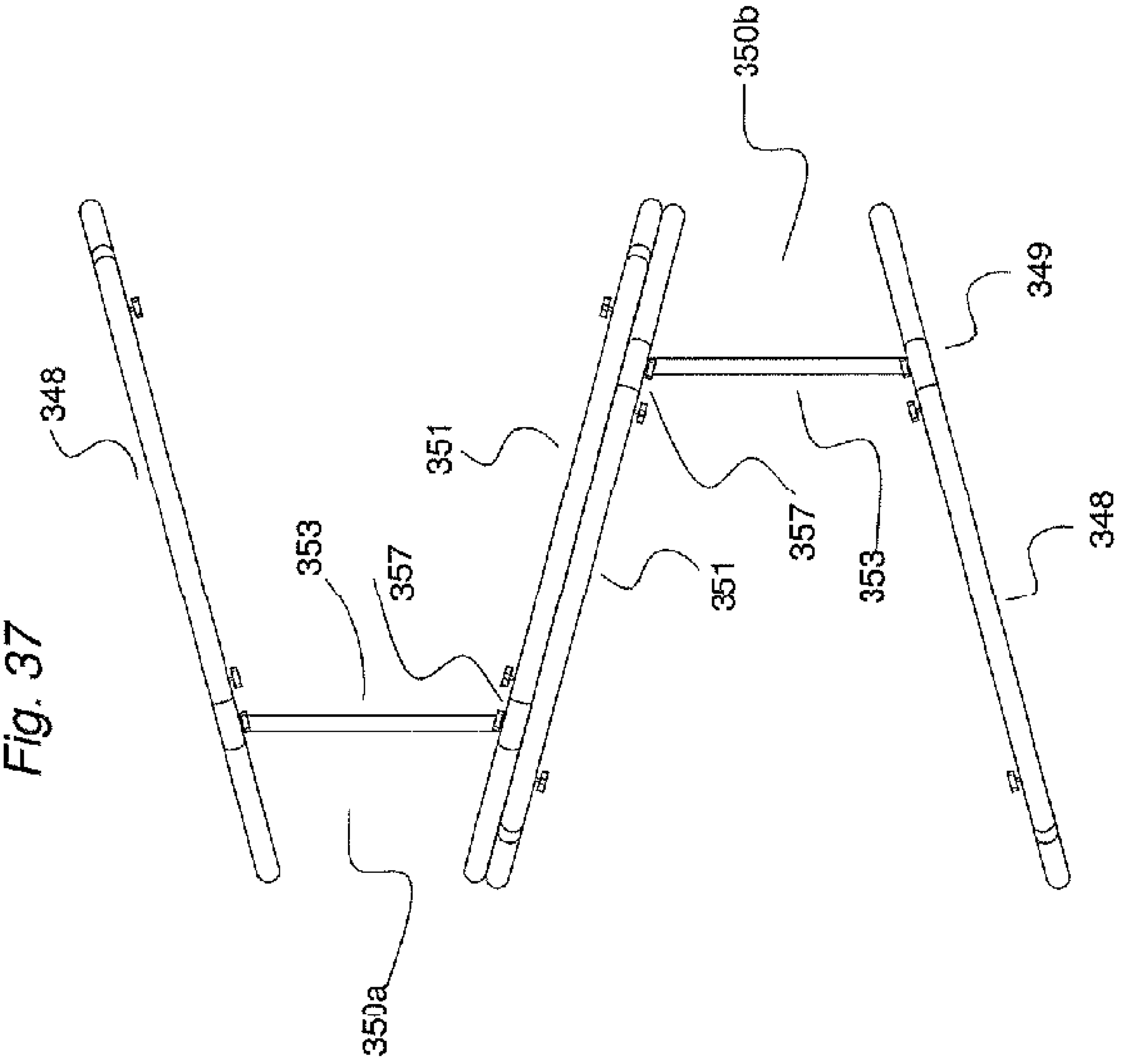
FIG. 37 is a top plan view of two systems according to FIG. 35 aligned side by side.

Multiple systems may be aligned in various groupings to accommodate dual or group work settings. For example, referring to FIG. 37, two systems 350*a*, 350*b* can be placed side by side in registration with one another. Frame supports 351 are aligned in contact with one another. Such frame supports 351 may be joined or bound with strapping, tape or hook and loop fasteners (Velcro) or fastener hardware to maintain the side by side registration. In this orientation, a user within system 350*a* faces the opposite direction of a user within system 350*b*.

Figure 38:
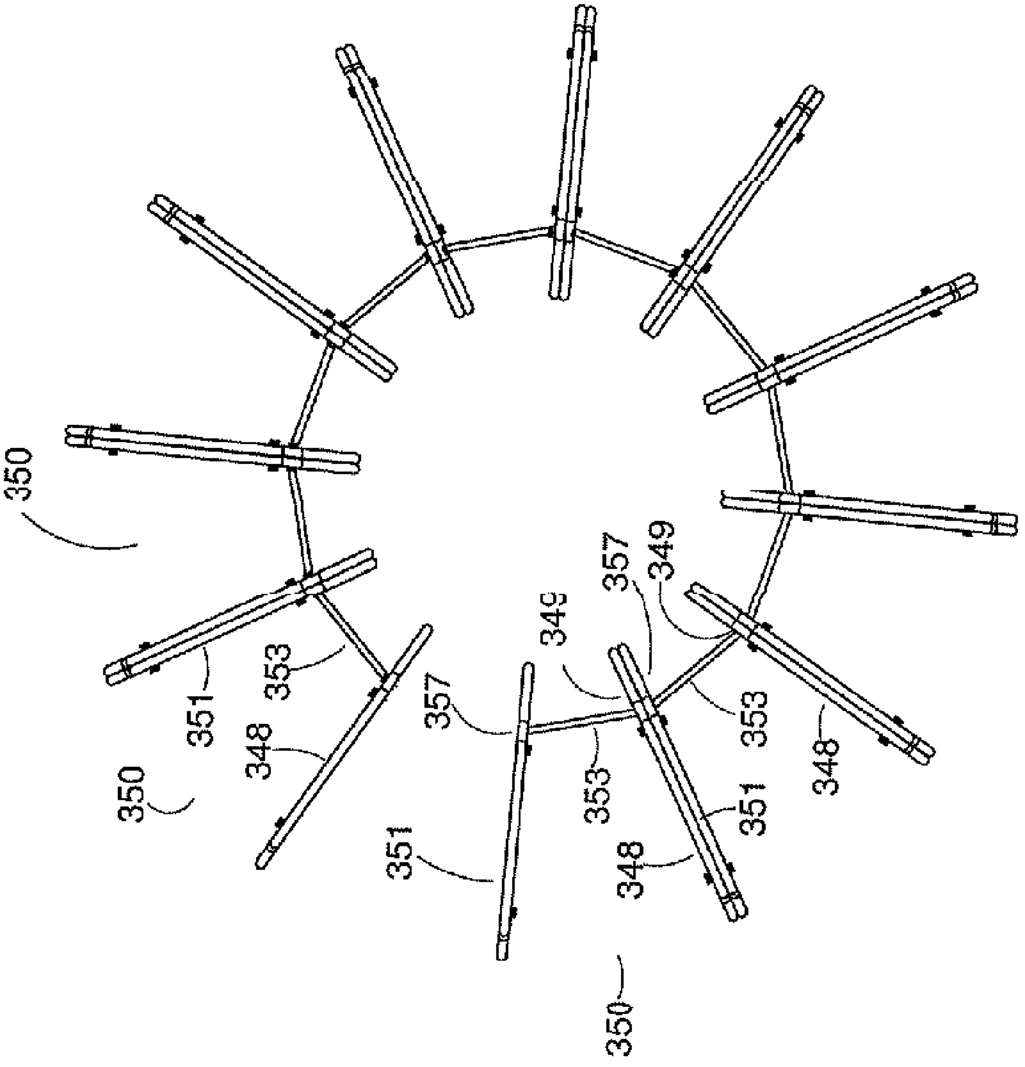
FIG. 38 is a top plan view of eleven systems according to FIG. 35 aligned side by side forming a classroom configuration.
Figure 39:
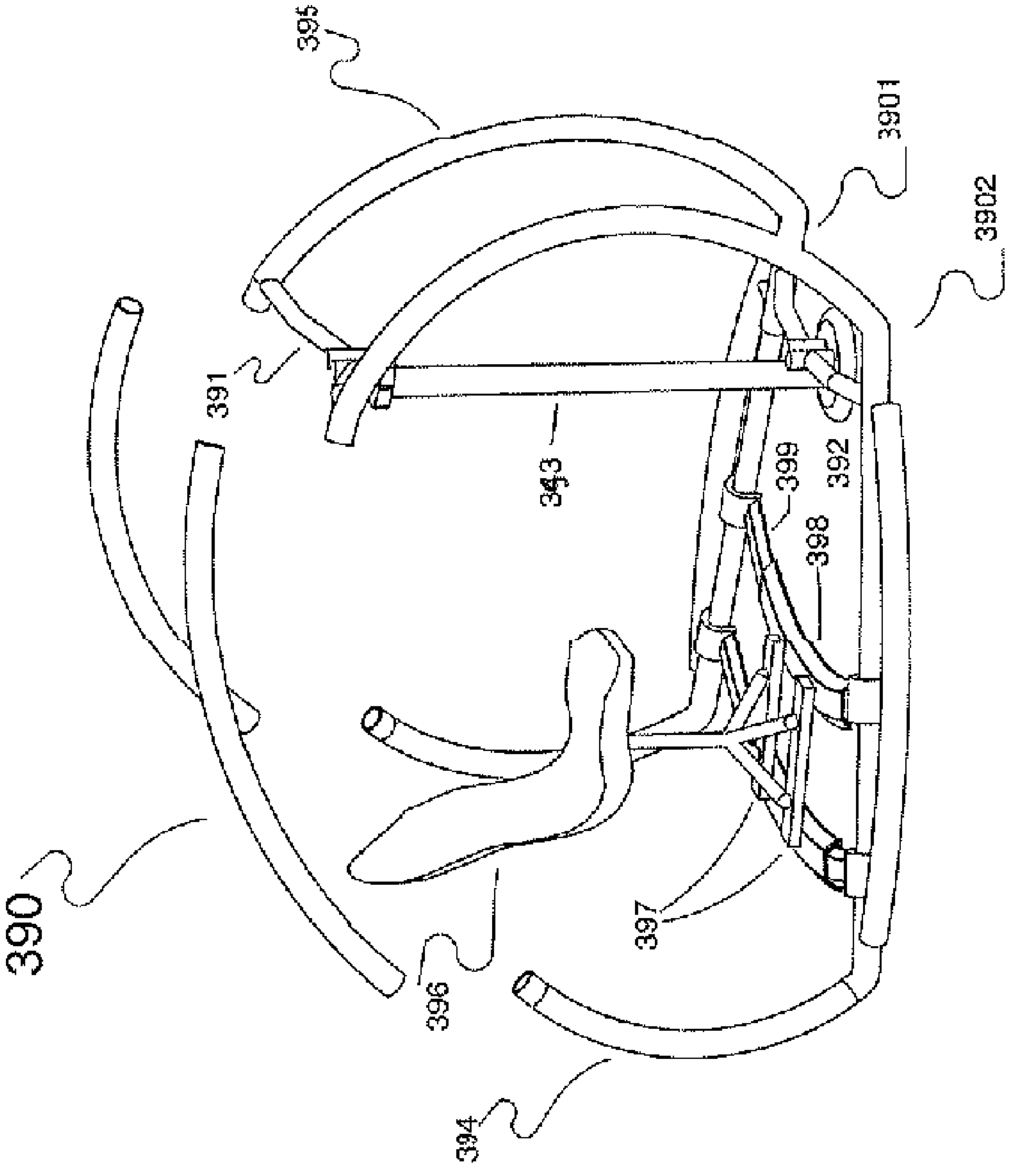
FIG. 39 is a perspective view of yet another embodiment of the system according to the invention with means for collapsing system footprint.
Figure 40:
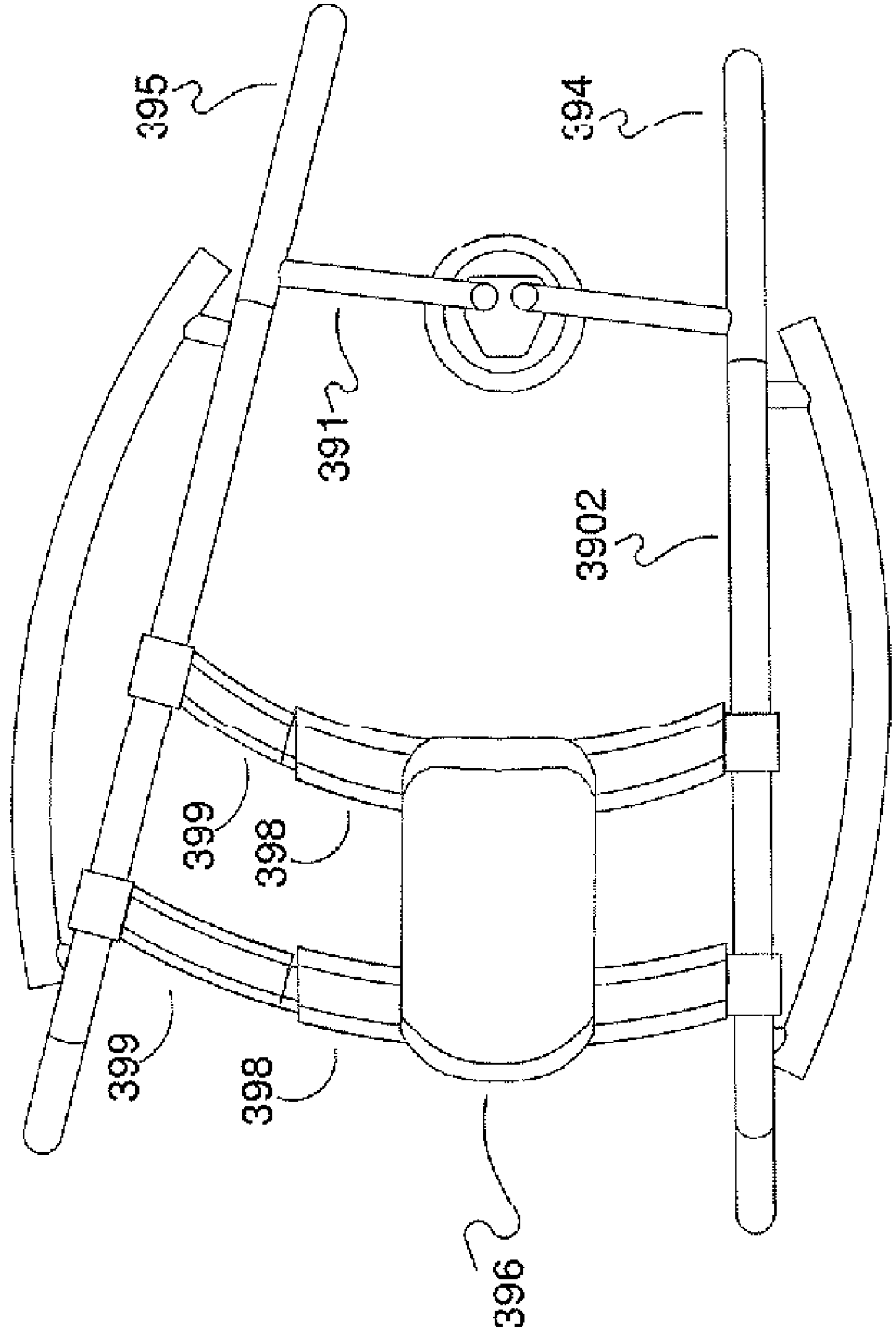
FIG. 40 is a top plan view of the system of FIG. 39.

Alternatively, a multiple user classroom may be formed by aligning multiple systems 350 in side by side relation such that the users of such systems face a common center or core area suitable for displaying instruction material or for an instructor to sit or stand. The frame supports 348, 351 of adjacent systems 350 may be joined or bound with strapping, tape or hook and loop fasteners (Velcro) or fastener hardware to maintain the side by side registration. In FIG. 38, eleven systems have been formed into a classroom such that the rear portions of the systems are splayed away from the center or core area. FIGS. 39 and 40 show a system 390 embodiment that includes a center post 393 for supporting objects, which is particularly adapted for supporting larger, top-heavy objects such as computer monitor assemblies. In this embodiment, multi-part lateral supports 391, 392 are hinged at points of connection (close to their respective midpoints in FIG. 40). When the system 390 is expanded to be more open by moving frame supports 394, 395 away from one another, the hinges in the lateral supports 391, 392 are opened to extend the length of the lateral supports, and the inner space within the system widens. When the apparatus is narrowed by moving frame supports 394, 395 closer to one another, the hinges in the lateral supports 391, 392 are more closed and the inner space within the system collapses or narrows. The vertical center post 393 remains within the inner space in both the open and collapsed position of the system. Depending upon design preference, the frame supports 394, 395 may be substantially parallel to one another in the most closed position (not shown), and angled away from one another in more open positions, such as shown in FIGS. 39 and 40.

With this embodiment 390, a chair 396 is shown with footings 397 mounted to curved tracks 399. The mounting assembly for such footings consists of an arced sleeve 398, and a pair of similarly arced mounting brackets or tracks 399 attached on one end to the floor sections of the respective straight segments 3901, 3902 of the frame supports 394, 395. The tracks 399 telescope along a curved path to extend outwardly when the inner space is widened. The chair 396 in association with such footings 397, sleeve 398 and curved tracks 399 remains within the inner space in the collapsed or narrowed configuration, such that the chair 396 may remain within the inner space when the system 390 is translated to a new location by rolling the system along its outer periphery.

Figure 44:
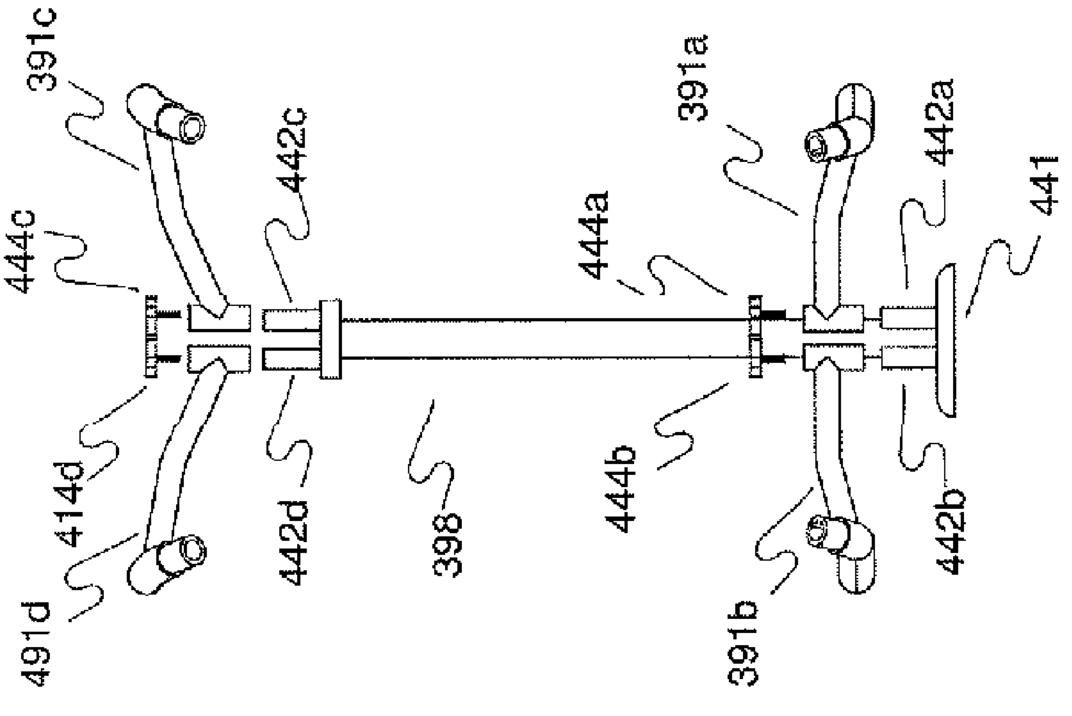
FIG. 44 is a right side elevational view partially exploded showing the center post and lateral supports of the system of FIGS. 39 and 40.

Referring to FIG. 44, additional details of the center post 393 and lateral supports 391 of the apparatus 390 are shown. The center post 393 mounted to a stand 441 that rests on a support surface when the apparatus 390 is in the working position. Upstanding posts 442*a*, 442*b* having threaded inner walls project from the stand 441. Tubular receiving portions of the lateral supports 391*a*, 391*b* fit over the posts 442*a*, 442*b*. The tubular receiving portions are removably connected to the posts 442*a*, 442*b* with set screws 444*a*, 444*b* that engage the threaded inner walls of the posts 442*a*, 442*b*. Similarly, upstanding posts 442*c*, 442*d* having threaded inner walls project from a shelf portion at the top of the center post 393. Tubular receiving portions of the lateral supports 391*c*, 391*d* fit over the posts 442*c*, 442*d*. The tubular receiving portions are removably connected to the posts 442*c*, 442*d* with set screws 444*c*, 444*d* that engage the threaded inner walls of the posts 442*c*, 442*d*. With this configuration, the lateral supports 391 may be swiveled or rotated about the vertical axis (e.g. Y-axis) of the posts 442. In such manner, a user may adjust the size and shape of the inner space by loosening the set screws 444 and swinging the lateral supports 391 in or out along the X-Z plane.

Figure 41:
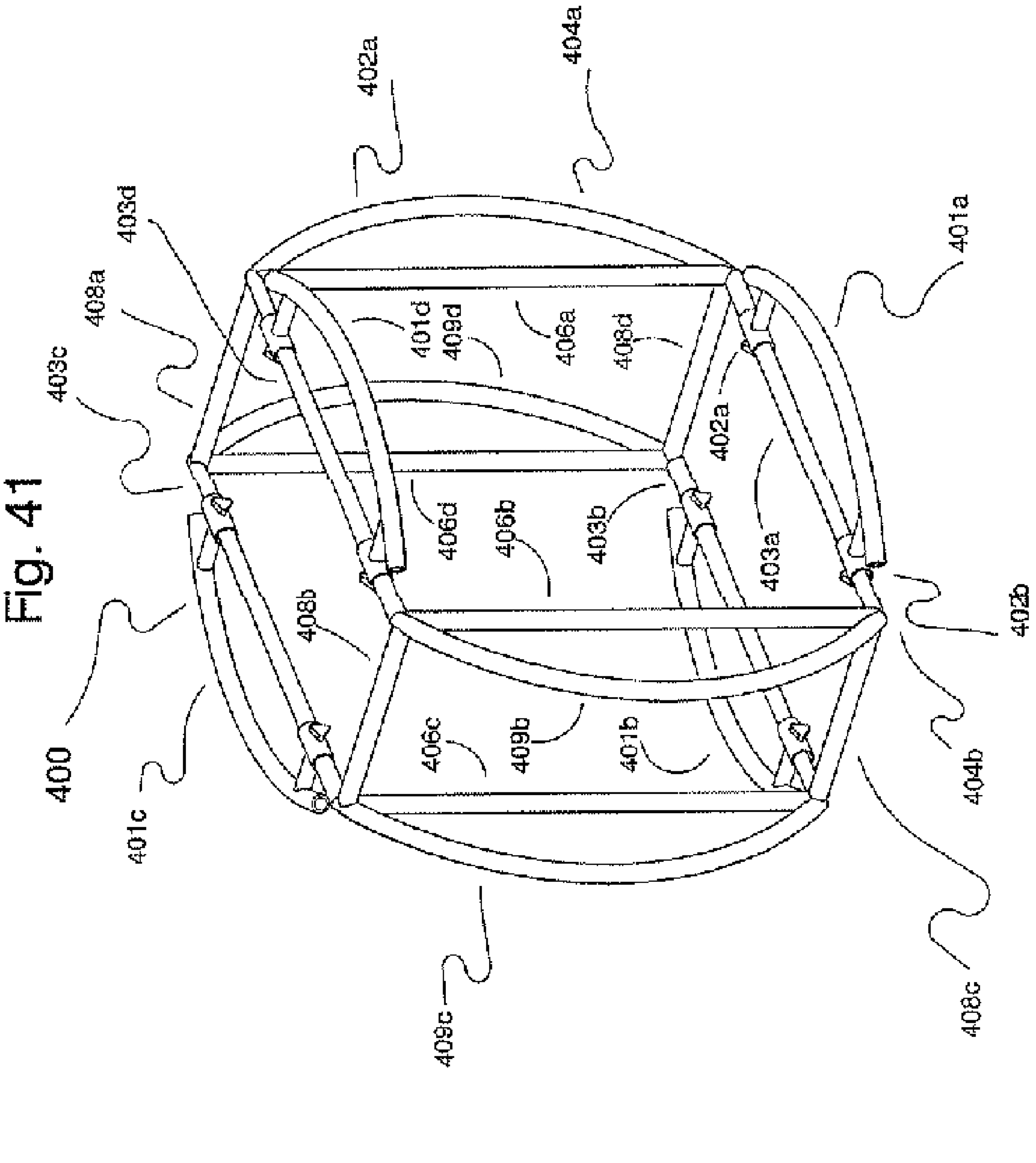
FIG. 41 is a perspective view of a still further embodiment of the system according to the invention adapted particularly for moving cargo or multiple objects.

FIG. 41 shows an embodiment of the invention as a transport apparatus 400 for cargo or multiple heavy objects, such as bags of drywall compound or concrete. The apparatus 400 has a frame defining an interior space, where the frame comprises vertical supports 406*a*, 406*b*, 406*c* and 406*d* that join two opposed rectangular frames, with the lower frame formed from sides 403*a*, 403*b*, 408*c* and 408*d* and the upper frame formed from sides 403*c*, 403*d*, 408*a* and 408*b*. The apparatus 400 is outfitted with hinged foot sections 401*a*, 401*b*, 401*c*, 401*d* rotatably mounted on opposing straight sides 403*a*, 403*b*, 403*c*, and 403*d* with slip on fittings 402*a*, 402*b*. The fittings 402*a*, 402*b* may be tightened by screws such as 404*a*, 404*b*. The apparatus 400 further has arced segments 409*a*, 409*b*, 409*c* and 409*d* associated with the other opposing sides 406*a*, 406*b*, 406*c* and 406*d*.

To lift a load with the apparatus 400, the foot sections on one of the uprights are each fully extended so that the feet and the upright are in the same plane (not shown in FIG. 41). The other upright remains in the jack-knifed position. The apparatus 400 is then lifted over the load (not shown in FIG. 41) and laid down on its side over the load to be transported, whereby the upright with the extended feet (such as 401*a*, 401*b*) is laid flat on the ground such that the load is contained in the interior space of the apparatus. The load is then affixed to the interior of the apparatus using rope, bungee cords or hardware as desired, whereby loads with irregular weight distribution are positioned such that the center of gravity of such load roughly occupies the same space as the center of gravity within the apparatus to facilitate a smooth and regular rolling motion (not shown in FIG. 41). To lift and transport the affixed load, the apparatus 400 is lifted by the upright with the jackknifed foot section so that the structure including the load rests in vertical alignment on the arced segments of the uprights (such as 409*a*, 409*d*). The jackknifed foot sections are then readjusted to the extended position so that the perimeter of the uprights and foot sections form a circular shape (such as 401*a*, 409*b*, 401*d* and 409*a* form one circular shape and 401*b*, 409*c*, 401*c* and 409*d* form a corresponding circular shape). The circular shape allows the apparatus 400 and affixed load to be translated to another location by rolling along the circular perimeter of the apparatus.

To unload the apparatus 400 the above procedure is executed in reverse. Alternatively, if the load comprises bagged materials, the bags can be emptied from the apparatus by opening the bag and allowing the contents to flow out by action of gravity. The apparatus 400 may be tilted or rocked when unloading. Once the load has been removed, at least two opposing foot sections 401*a*, 401*b*, 401*c* and 401*d* can be set in the jackknifed position (in FIG. 40 all foot sections are shown in jackknifed position) to create a stable workspace. In jackknifed position, the upper foot sections 401*c*, 401*d* can accommodate a flat work surface or accessories such as a wash basin, paint containers, or other items (not shown in FIG. 41). The apparatus structure can be constructed of hollow pipe or tubing to act as conduit for fluids or gases, such as water for washing drywall tools or gas for welding instruments, to the workspace.

With the transport apparatus 400 of FIG. 41, alternatively a closed vessel (not shown) such as a container with a hinged lid or nozzle for carrying loose or fluid materials such as sand, rocks, or water can be attached to the support frame (E.G., 403*a*, 403*b*, 403*c* and/or 403*d*) in the interior space of the apparatus and transported by rolling. Such a vessel can also be used to mix materials such as drywall compound or concrete, whereby both a large opening for adding the raw materials such as a hinged lid, as well as a smaller opening for dispensing the mixed materials, such as a nozzle or hose, can be provided on the same of the container. To add or dispense materials, the apparatus 400 is rolled onto the appropriate side so that the required opening is either on the top or the bottom depending on whether the materials are to be added or dispensed. Consequently, only one side of the vessel comes in contact with the materials, thereby simplifying clean up. To mix materials, the apparatus 400 is rolled or rocked back and forth in place.

Figure 42:
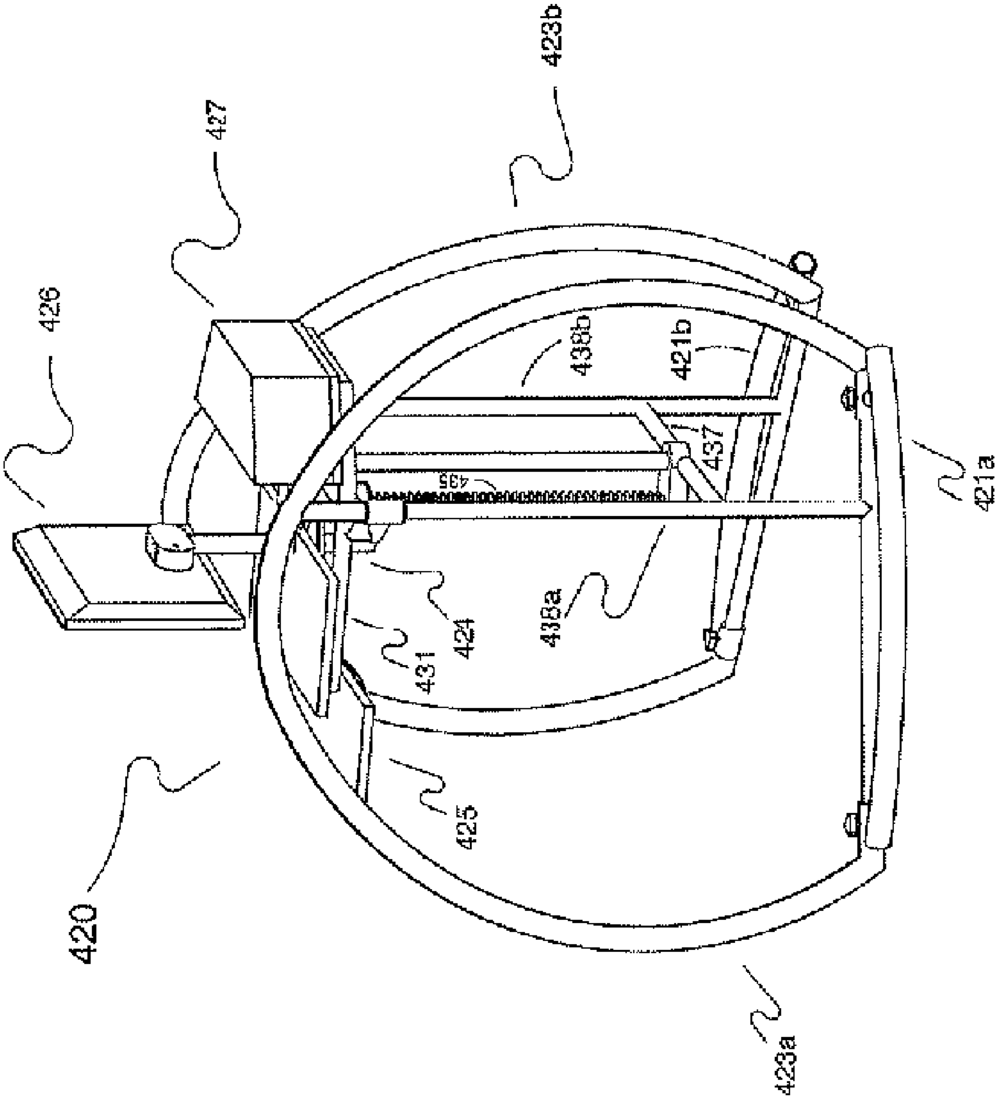
FIG. 42 is a perspective view of another embodiment of the system according to the invention adapted with a smaller footprint and shorter height particularly advantageous for space-restricted work places.

Referring next to FIG. 42, a system 420 is shown that has a smaller footprint than other embodiments heretofore described. Such system 420 may find application in work spaces that have limited space or need to accommodate multiple personnel and/or equipment, such as in hospitals, health care facilities and operating rooms. The height of the spaced apart arcuate frame members 423*a*, 423*b* may be correspondingly shorter than alternative frames shown in other embodiments. The distance between such arcuate frame members 423*a*, 423*b* may be correspondingly more narrow than alternative frames shown in other embodiments. Arced foot segments 421*a*, 421*b* are rotatably adjustable between a working position (shown in FIG. 42) and a translating position for rotation.

Figure 43:
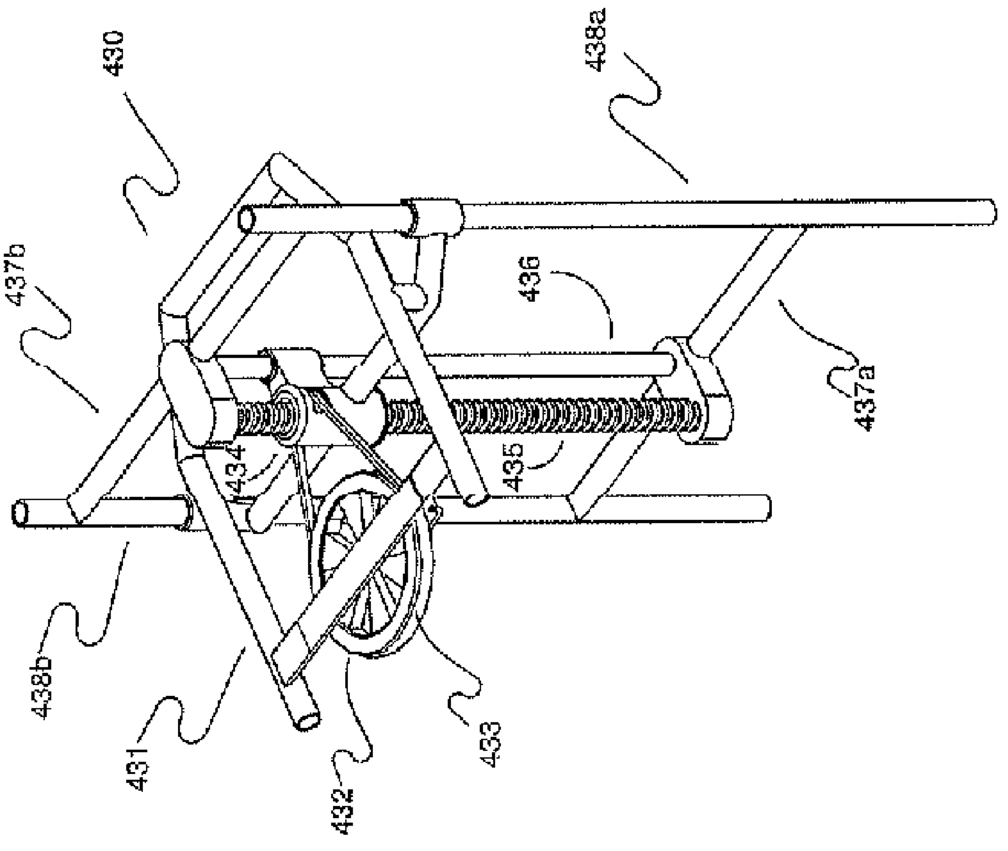
FIG. 43 is a perspective view of a lift mechanism also shown in FIG. 42.

The system 420 has an elevator assembly 430 (see FIG. 43) with a frame 431 that supports a keyboard surface 414, a horizontal workspace 415 and a monitor mount 416 on the front side, and a console 417 for electronic devices on the rear side. Referring to FIG. 43, the elevator assembly 430 permits height adjustment by a flywheel 432 which is connected by a belt 433 to a bearing assembly 434. The bearings are contained within a housing to which the support structure 436, 438*a*, 438*b* for the elevator assembly is attached. Turning the flywheel 432 moves the belt 433 and results in a corresponding rotation of the bearings that is translated into vertical motion as the bearings rotate around the threaded pole or jackscrew 435, which is affixed to a lateral support frame 437*a*, 437*b* at the upper and lower ends. In this way, the entire elevator assembly 430 is vertically adjustable. This system 420 with the elevator assembly 430 can accommodate users of varying heights in various working positions, such as sitting, reclining or standing.

Figure 45:
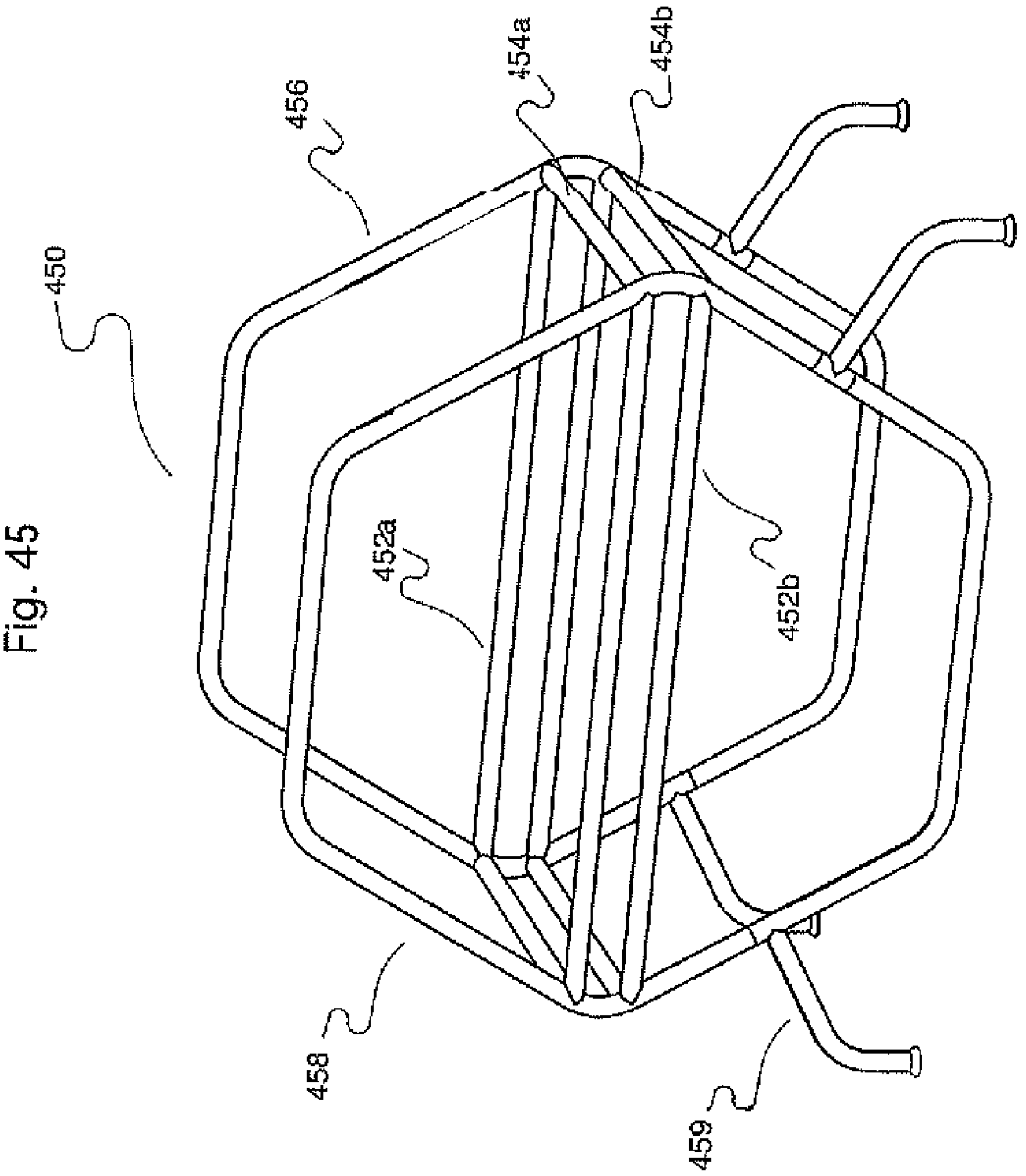
FIG. 45 is a perspective view of still another embodiment of the system according to the invention adapted to support a mattress.

FIG. 45 shows an embodiment of the apparatus 450 adapted for use as a bed frame. A bed mattress (not shown in FIG. 45) may be attached to generally horizontal lateral supports 452*a*, 452*b*, 454*a*, 454*b* that extend between supporting upright frame segments 456, 458 forming a hexagonal rollable periphery of the apparatus. Detachable legs 459 extend from opposed flat side segments of the hexagonal supports to stabilize the apparatus 450 from rocking or movement when in the stable rest or sleeping position. The legs 459 rotatably swivel around the hexagonal supports to permit a user to roll or rock the apparatus into a new position.

A user may recline on the bed mattress (not shown in FIG. 45) supported by the lateral supports 452*a*, 452*b*, 454*a*, 454*b*, such that the users center of gravity remains roughly at the center point of the structure 450. Accordingly, the apparatus may be tilted or rocked forward or back with a user still reclining on the bed mattress. In this way, users may be patients who are infirm, or overweight or immobilized, and medical assistants or healthcare personnel of average size and strength may effectively tilt or rock the apparatus as necessary to facilitate patient care. Alternatively, where greater strength is required to move the apparatus, a mechanical lifting device, such as a bottle jack or crank jack (not shown), may be placed under one or more of the periphery supports or under the lateral support(s) to tilt the apparatus. The bed mattress and patient thereon can be tilted upwards from a flat, generally horizontal resting orientation to an angled, or upright sitting or standing orientation. The tilted orientation makes it easier for the patient to lift upper body weight from the bed for washing or treatment, or for healthcare personnel to assist the patient. From the leaning forward position, straps or slings (not shown in FIG. 45) can be slipped behind the patient's upper body and torso. To lift the patient completely from the bed for changing linens or washing, the process can be repeated from the opposite side to move straps or slings (not shown in FIG. 45) under the patient's legs and torso, which can be used along with a pulley or other mechanical lifting device (not shown) to hoist the patient out of the bed using the upright supports to support the patient's body weight. The upper sections of the upright supports 456, 458 can be removed (as in FIG. 39, see also FIG. 15) or can be outfitted with electronic entertainment or other devices (not shown in FIG. 45) for use by a patient in fully reclining position.

The foregoing description of the invention illustrates and describes the present invention. Additionally, the disclosure shows and describes only the preferred embodiments of the invention, but it is to be understood that the invention is capable of use in various other combinations, modifications, and environments and is capable of changes or modifications within the scope of the inventive concept as expressed herein, commensurate with the above teachings, and/or the skill or knowledge in the art of recycling and, more particularly consumer recycling and incentive programs.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

The invention claimed is:

1. A transport system, comprising:

a first support member comprising a rollable periphery, wherein said first support member further comprises at least one pivotally attached first base member;

a second support member comprising a rollable periphery, wherein said second support member further comprises at least one pivotally attached second base member and wherein said second support member is generally parallel to the first support member; and at least one lateral support member attaching the first support member to the second support member, wherein the pivotally attached first base member is aligned generally opposite the pivotally attached second base member;

wherein said system comprises at least one stable resting configuration and at least one transport configuration for translating from one location to another; wherein the pivotally attached first base member is generally perpendicular to the first support member and the pivotally attached second base member is generally perpendicular to the second support member to comprise the resting configuration.

2. The system of claim 1, wherein the pivotally attached first base member is aligned with the rollable periphery of the first support member and the second base member is aligned with the rollable periphery of the second support member to comprise the transport configuration.

3. The system of claim 1 further comprising:

at least one locking element to positionally secure each base member to its support member when in the resting and transport configurations.

4. The system of claim 1, wherein the rollable periphery of the first support member and the rollable periphery of the second support member are comprised of a shape selected from the group comprising circular, oblong, elliptical and polygonal.

5. The system of claim 4, wherein the shape of the rollable periphery of the first support member and the shape of the rollable periphery of the second support member are substantially identical.

6. The system of claim 1, wherein a length of at least one lateral support is adjustable.

7. The system of claim 1, wherein the adjustable lateral support comprises:

an outer portion attached on one end to either the first support member or the second support member and further comprising:

a receiving aperture on the other end; and an inner chamber comprising a volume;

an inner portion attached to the other support member; and a lateral support locking mechanism, wherein the lateral support is adjusted by inserting and sliding the inner portion through the receiving aperture and into the inner chamber of the outer portion and securing the lateral support locking mechanism at the desired length of the lateral support.

8. The system of claim 1, wherein the rollable periphery of the first support member is a closed shape comprising a plurality of chord segments that total 360 degrees, wherein at least one chord segment defines a pivotal axis between the first support member and the first base member.

9. The system of claim 8, wherein the rollable periphery of the second support member is a closed shape comprising a plurality of chord segments that total 360 degrees, wherein at least one chord segment defines a pivotal axis between the second support member and the second base member.

10. The system of claim 1, wherein at least one base member is pivotally attached to its support member by at least one hinge.

11. The system of claim 3, wherein the locking element comprises a winged bolt and threaded aperture assembly.

12. The system of claim 3, wherein the locking element comprises a spring button and hole assembly.

13. The system of claim 1, wherein the lateral support locking mechanism comprises a winged bolt and a plurality of threaded apertures.

14. The system of claim 1, wherein the lateral support locking mechanism comprises a spring button and a plurality of apertures.

15. The system of claim 1, wherein the first support member, the second support member and the at least one lateral support member are detachably connected and may be separated from each other to disassemble the system.

* * * * *